(12) United States Patent
Zhu et al.

(10) Patent No.: US 9,668,179 B2
(45) Date of Patent: May 30, 2017

(54) RECEIVING EMBMS ON A SINGLE-RADIO-MULTIPLE-STANDBY USER EQUIPMENT

(71) Applicant: QUALCOMM Incorporated, San Diego, CA (US)

(72) Inventors: Xipeng Zhu, Beijing (CN); Jun Wang, Poway, CA (US); Xiaoxia Zhang, San Diego, CA (US); Kuo-Chun Lee, San Diego, CA (US); Ruiming Zheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 204 days.

(21) Appl. No.: 14/558,822

(22) Filed: Dec. 3, 2014

(65) Prior Publication Data

US 2015/0304989 A1 Oct. 22, 2015

Related U.S. Application Data

(63) Continuation of application No. PCT/CN2014/075935, filed on Apr. 22, 2014.

(51) Int. Cl.
*H04W 4/00* (2009.01)
*H04L 12/28* (2006.01)
(Continued)

(52) U.S. Cl.
CPC ....... *H04W 36/0066* (2013.01); *H04W 24/10* (2013.01); *H04L 1/00* (2013.01); *H04W 48/16* (2013.01); *H04W 72/1215* (2013.01)

(58) Field of Classification Search
CPC . H04W 72/1278; H04W 24/00; H04W 88/06; H04W 72/04; H04W 72/00;
(Continued)

(56) References Cited

U.S. PATENT DOCUMENTS 8,738,021 B2   5/2014  Mutya et al.
8,761,788 B2   6/2014  Rajurkar et al.
(Continued)

FOREIGN PATENT DOCUMENTS

WO     2014028423 A1    2/2014

OTHER PUBLICATIONS

International Search Report and Written Opinion—PCT/CN2014/075935—ISA/EPO—Feb. 6, 2015.

*Primary Examiner* — Hanh N Nguyen
(74) *Attorney, Agent, or Firm* — The Marbury Law Group, PLLC

(57) ABSTRACT

Embodiments methods implemented with a server or a processor of a mobile communication device (e.g., a multi-standby communication device) reduce the redundancy information needed to achieve adequate reception service on a first radio access technology (RAT) sharing an RF resource with a second RAT. The device processor may implement at least one tune-away management strategy that mitigates the amount of data for the first RAT that is lost during the tune-away event. Thus, by implementing the one or more tune-away management strategies, the device processor may ensure that less redundancy information overhead is needed to correct or replace lost or partially received data, improving latency, channel usage, and the first RAT's overall reception performance. In some embodiments, a server may implement one or more strategies for including redundancy information into data that is sent to a first RAT to mitigate the negative effects of tune aways on the first RAT.

26 Claims, 16 Drawing Sheets

(51) Int. Cl.
*H04W 36/00* (2009.01)
*H04W 24/10* (2009.01)
*H04L 1/00* (2006.01)
*H04W 72/12* (2009.01)
*H04W 48/16* (2009.01)

(58) Field of Classification Search
CPC ........... H04W 36/0088; H04W 72/005; H04W 72/0446; H04W 36/0066; H04W 48/16; H04W 56/001; H04W 28/0273; H04W 80/06
USPC ............. 370/328–332, 395.21, 395.5, 395.4, 370/337–338
See application file for complete search history.

(56) References Cited

U.S. PATENT DOCUMENTS

| | | | |
|---|---|---|---|
| 2010/0296483 A1* | 11/2010 | Sayeedi | H04W 36/385 370/331 |
| 2012/0178402 A1* | 7/2012 | Krishnamoorthy | H04W 4/22 455/404.1 |
| 2013/0244590 A1 | 9/2013 | Nukala et al. | |
| 2013/0260758 A1 | 10/2013 | Zhao et al. | |
| 2013/0260761 A1 | 10/2013 | Walke et al. | |
| 2013/0294417 A1 | 11/2013 | Yerrabommanahalli et al. | |
| 2013/0303240 A1 | 11/2013 | Sanka et al. | |
| 2014/0044046 A1* | 2/2014 | Vangala | H04W 28/0273 370/328 |

* cited by examiner

RECEIVING EMBMS ON A SINGLE-RADIO-MULTIPLE-STANDBY USER EQUIPMENT

CROSS REFERENCE TO RELATED APPLICATIONS

This application is a continuation of International Patent Application No. PCT/CN2014/075935 entitled "RECEIVING EMBMS ON A SINGLE-RADIO-MULTIPLE-STANDBY USER EQUIPMENT" filed Apr. 22, 2014, the entire contents of which are hereby incorporated by reference.

BACKGROUND

Some new designs of mobile communication devices—such as smart phones, tablet computers, and laptop computers—contain one or more Subscriber Identity Module ("SIM") cards that provide users with access to multiple separate mobile telephony networks. Examples of mobile telephony networks include GSM, LTE, TD-SCDMA, CDMA2000, and WCDMA. A mobile communication device that includes one or more SIMs and connects to two or more separate mobile telephony networks using one or more shared radio frequency ("RF") resources/radios is termed a "multi-standby" communication device. An example is a dual-SIM-dual-standby ("DSDS") communication device, which includes two SIM cards/subscriptions that are each associated with a separate radio access technology ("RAT"), and the separate RATs share one RF chain to communicate with two separate mobile telephony networks on behalf of their respective subscriptions. Another example is a single-radio LTE ("SRLTE") communication device, which includes one SIM card/subscription associated with two RATs that share a single shared RF resource to connect to two separate mobile networks on behalf of the one subscription.

A plurality of RATs on a multi-standby communication device utilize one or more shared RF resources to communicate with their respective mobile telephony networks, and only one RAT may use each RF resource to communicate with its mobile network at a time. Thus, even when a RAT is in an "idle-standby" mode, meaning the RAT is not actively communicating with the network, the RAT may still need to periodically receive access to a shared RF resource in order to perform various network operations. For example, an idle RAT may need the shared RF resource at regular intervals to perform idle-mode operations to receive network paging messages in order to remain connected to the network, etc. on behalf of the RAT's subscription. Therefore, at certain times, the multiple RATs sharing an RF resource may need to use the RF resource to communicate with their respective mobile networks simultaneously.

In conventional multi-standby communication devices, the RAT actively using an RF resource that is shared with an idle RAT may occasionally be forced to interrupt the active RAT's RF operations so that the idle RAT may use the shared RF resource to perform the idle RAT's idle-standby mode operations (e.g., paging monitoring, cell reselection, system information monitoring, etc.). This process of switching access of the shared RF resource from the active RAT to the idle RAT is sometimes referred to as a "tune-away," as the RF resource must tune away from the active RAT's frequency band or channel and tune to the idle RAT's frequency bands or channels. After the idle RAT has finished its network communications (sometimes collectively referred to herein as "tune-away operations), access to the RF resource may switch from the idle RAT to the active RAT via a "tune-back" operation.

As a result of the multi-standby communication device's tune aways, the signals received by the active RAT may become corrupted and difficult or impossible to decode because portions of the signal, data, packets, etc. sent from the active RAT's network are lost during the tune-away event. As such, tune-away events present a design and operational challenge for shared-radio devices, such as multi-standby communication devices, due to the necessity of tuning away from an active RAT to an idle RAT for the benefit of an inactive RAT in these devices.

SUMMARY

Various embodiments provide methods, devices, and non-transitory processor-readable storage media for managing tune-away events between a first radio access technology (RAT) and a second RAT on a multi-standby communication device.

Some embodiment methods may include determining a start time of a tune-away event from the first RAT to the second RAT that is scheduled to occur next in which the RF resource will tune from the frequency band or channel of the first subscription to the frequency band or channel of the second subscription, implementing a tune-away management strategy during the tune-away event in response to determining that the tune-away event has started or is about to start, and resuming normal operations with the first RAT in response to determining that the tune-away event has ended.

In some embodiments, implementing a tune-away management strategy during the tune-away event may include determining whether to prevent a tune away from the first RAT to the frequency band or channel of the second RAT during the tune-away event based on one or more of a number of symbols of a current segment that have been received, a number of symbols of the current segment remaining to be received, a number of symbols of the current segment estimated to be lost during the tune-away event, and a threshold number of symbols needed to decode the current segment and initiating a tune away from the first RAT to the second RAT based on the determination.

In some embodiments, implementing a tune-away management strategy during the tune-away event may include initiating a tune away from the first RAT to the second RAT, determining whether tune-away operations of the second RAT have ended before an expected end of the tune-away event, and initiating a tune back to the first RAT from the second RAT in response to determining that the tune-away operations of the second RAT have ended before the expected end of the tune-away event.

In some embodiments, implementing a tune-away management strategy during the tune-away event may include initiating a tune away from the first RAT to the second RAT, determining whether the first RAT needs to receive critical data during the tune-away event, initiating a tune back to the first RAT from the second RAT to enable the first RAT to receive the critical data, and initiating another tune away from the first RAT to the second RAT.

In some embodiments, implementing a tune-away management strategy during the tune-away event may include determining whether the second RAT is scheduled to perform at least one of cell-reselection measurements and system-information monitoring during the tune-away event, determining a gap in reception activities of the first RAT in response to determining that the second RAT is scheduled to perform at least one of cell-reselection measurements and system-information monitoring during the tune-away event, rescheduling the start time of the tune-away event to correspond with the gap in reception activities of the first RAT, and initiating a tune away from the first RAT to the second RAT at the rescheduled start time.

In some embodiments, implementing a tune-away management strategy during the tune-away event may include determining a first priority of the first RAT during the tune-away event, determining a second priority of the second RAT during the tune-away event, determining whether the first priority is less than the second priority during the tune-away event wherein a priority associated with unicast data is less than a priority associated with broadcast data, initiating a tune away from the first RAT to the second RAT for an entire duration of the tune-away event in response to determining that the first priority is less than the second priority, and preventing a tune away from the first RAT to the second RAT for the entire duration of the tune-away event in response to determining that the second priority does not exceed the first priority.

In some embodiments, implementing a tune-away management strategy during the tune-away event may include determining a number of symbols that have been received for a segment currently being received for the first RAT, determining a number of symbols of the current segment remaining to be received, determining whether a threshold number of symbols exceeds a sum of the number of received symbols and the number of symbols of the current segment remaining to be received, and initiating a tune away from the first RAT to the second RAT in response to determining that the threshold number of symbols exceeds the sum of the number of received symbols and the number of symbols of the current segment remaining to be received. In some embodiments, the methods may include estimating a number of symbols of the current segment that would be lost during the tune-away event in response to determining that the threshold number of symbols does not exceed the sum of the number of received symbols and the number of symbols of the current segment remaining to be received, determining whether a difference between the sum and the estimated number of lost symbols is less than the threshold number of symbols, initiating a tune away from the first RAT to the second RAT in response to determining that the difference is not less than the threshold number of symbols, and preventing a tune away from the first RAT to the second RAT for an entire duration of the tune-away event in response to determining that the difference is less than the threshold number of symbols.

In some embodiments, implementing a tune-away management strategy during the tune-away event may include configuring the second RAT to receive with one of a plurality of diversity receivers and the first RAT to receive with a remainder of the plurality of diversity receivers during the tune-away event. In some embodiments, configuring the second RAT to receive with one of a plurality of diversity receivers and the first RAT to receive with a remainder of the plurality of diversity receivers during the tune-away event may include determining whether configuring the first RAT to receive with fewer than all of the plurality of diversity receivers during the tune-away event would cause the first RAT to experience unacceptable performance, preventing a tune away from the first RAT to the second RAT during the tune-away event in response to determining that configuring the first RAT to receive with fewer than all of the plurality of diversity receivers during the tune-away event would result in unacceptable performance, and configuring the second RAT to receive with one of the plurality of diversity receivers and the first RAT to receive with the remainder of the plurality of diversity receivers during the tune-away event in response to determining that configuring the first RAT to receive with fewer than all of the plurality of diversity receivers during the tune-away event would not result in unacceptable performance.

Various embodiments may include a multi-standby communication device configured with processor-executable instructions to perform operations of the methods described above.

Various embodiments may include a multi-standby communication device having means for performing functions of the operations of the methods described above.

Various embodiments may include non-transitory processor-readable media on which are stored processor-executable instructions configured to cause a processor of a multi-standby communication device to perform operations of the methods described above.

Various embodiments provide methods, servers, and non-transitory processor-readable storage media for reducing redundancy information overhead needed by a multi-standby communication device performing tune aways between a first radio access technology (RAT) and a second RAT.

In some embodiments, the methods may include identifying at least one segment of content to be sent to the multi-standby communication device, modifying the at least one segment of content in order to increase performance of the first RAT during a tune-away event, and sending the at least one modified segment of content to the multi-standby communication device. In some embodiments, the methods may also include determining a current redundancy information overhead value, and sending the current redundancy information overhead value to the multi-standby communication device to enable the multi-standby communication device to improve the performance of the first RAT during the tune-away event.

In some embodiments, modifying the at least one segment of content in order to increase performance of the first RAT during a tune-away event may include identifying a group of segments of content for transmission to the multi-standby communication device and at least one mobile communication device that does not perform tune aways, transmitting the group of segments of content to the at least one mobile communication device that does not perform tune aways and the multi-standby communication device via a first temporary mobile group identity (TMGI), generating group-level redundancy information, and transmitting the group-level redundancy information to the multi-standby communication device via a second TMGI.

In some embodiments, modifying the at least one segment of content in order to increase performance of the first RAT during a tune-away event may include identifying a group of segments for transmission to the multi-standby communication device, generating an additional segment of redundancy information for the group of segments, and transmitting the additional segment of redundancy information and the group of segments to the multi-standby communication device.

In some embodiments, the at least one segment of content may include a plurality of segments, and modifying the at least one segment of content in order to increase performance of the first RAT during a tune-away event may include interleaving the plurality of segments.

Various embodiments may include a server configured with server-executable instructions to perform operations of the methods described above.

Various embodiments may include a server having means for performing functions of the operations of the methods described above.

Various embodiments may include non-transitory processor-readable media on which are stored processor-executable instructions configured to cause a processor of a server to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
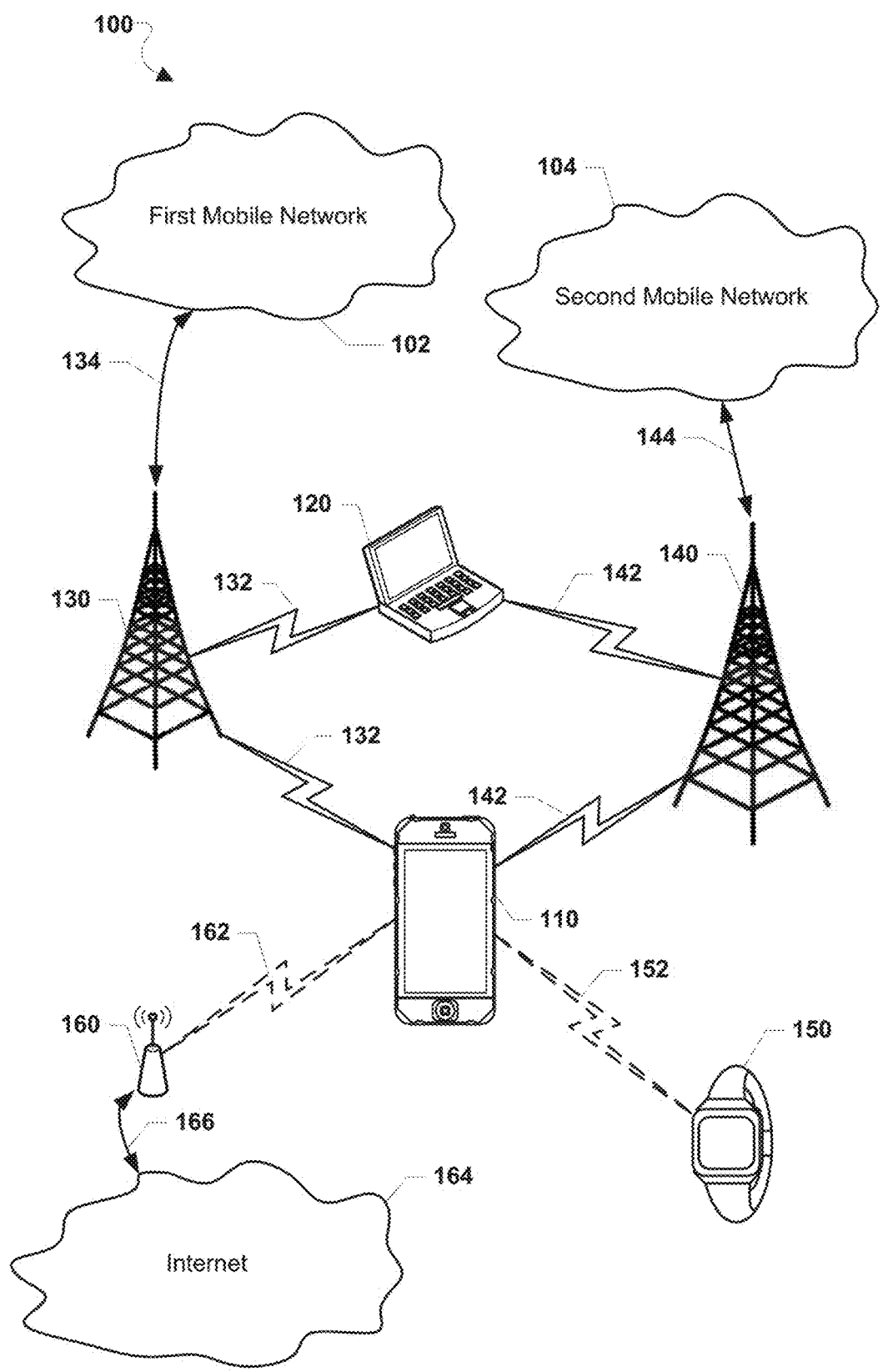
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

As used herein, the term "multi-standby communication device" refers to any one or all of cellular telephones, smart phones, personal or mobile multimedia players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of RATs that utilize at least one shared RF chain, which may include one or more of antennae, radios, transceivers, etc.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the multi-standby communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

Conventional multi-standby communication devices supporting one or more RATs, including an active (or "first") RAT and an idle (or "second") RAT, may occasionally need to tune away from the first RAT to the second RAT in order to enable the second RAT to perform various tune-away operations. Such tune-away operations may include one or more of page monitoring, system information monitoring (e.g., receiving and decoding a broadcast control channel), cell reselection measurements to determine whether to initiate reselection operations to a neighboring cell, updating the second RAT's network with the multi-standby communication device's current location, receiving Short Message Service (SMS) messages, and receiving mobile-terminated calls.

While the second RAT has access to the shared RF resource in order to perform tune-away operations (i.e., during a "tune-away event"), the first RAT's communication activities may be interrupted, causing the first RAT to partially receive or lose data/entire messages sent from the first RAT's network during the tune-away event, which may degrade the first RAT's overall reception performance. Tune-away events may be especially disruptive to the first RAT's reception service and performance in situations in which the first RAT is prevented from receiving time-sensitive data, such as when the first RAT receives streaming multimedia (e.g., video and audio data segments) via multimedia broadcast multicast services over LTE or "eMBMS."

Currently, a server or content provider operating in the first RAT's network may attempt to mitigate the effects of lost or partially received data by adding redundancy information in the content or data sent to the mobile communication device for the first RAT. This redundancy information enables the mobile communication device to replace missing data and to correct partial or corrupted data without requiring the server/content provider to retransmit the lost or incomplete data. For example, the operator may include forward error correction ("FEC") data to data packets when broadcasting streaming multimedia data via eMBMS. Adding FEC data to data packets enables multi-standby communication devices to recover data for a first RAT that is lost or partially received as a result of tune-away operations using well-known error correction techniques.

The amount of redundancy information (e.g., FEC data) included in transmissions (which is referred to as the "redundancy information overhead") may be adjusted to accommodate the expected amount of data that will be lost or partially received by mobile communication devices. Thus, a server may include a small amount of redundancy information overhead when only small portions of the data are expected to be lost or partially received by the mobile communications devices. In contrast, the server may utilize a comparably large amount of redundancy information overhead in broadcast packets when relatively large portions of the broadcast data are expected to be lost or partially received by the mobile computing devices. Due to the added data associated with redundancy information overhead, as the amount of redundancy information included in transmitted packets increases, the network latency increases as more data must be transmitted to and received by the multi-standby communication device. Also, the channel usage efficiency decreases as the amount of redundancy information included in transmitted packets increases for similar reasons.

In overview, various embodiments provide methods implemented with a processor of a mobile communication device (e.g., a multi-standby communication device) for reducing the redundancy information overhead needed to achieve adequate reception service on a first RAT sharing an RF resource on the mobile communication device with a second RAT. In particular, the mobile communication device processor may implement at least one tune-away management strategy that mitigates the amount of data for the first RAT that is lost during the tune-away event. By implementing the one or more tune-away management strategies, the device processor may ensure that less redundancy information overhead is needed to correct or replace lost/partially received data, thereby improving latency, channel usage, and the first RAT's overall reception performance.

In some embodiments, a server device controlling the broadcasting of data and/or content for reception by a first RAT in mobile devices may implement one or more strategies for including redundancy information into transmitted data/content to mitigate the negative effects of tune-aways on the reception performance of the first RAT.

In some embodiments, a first RAT and a second RAT may be associated with different subscriptions. However, in other circumstances, the first RAT and second RAT may be associated with the same subscription. Thus, it is anticipated that various embodiments may be useful in a variety of different multi-standby communication devices configurations in which a shared RF resource is shared by two or more RATs.

Specifically, various embodiments may be useful in multi-standby communication devices that individually include multiple subscriptions, each associated with one or more RATs that share one or more RF resources. For example, such multi-standby communication devices may include DSDS or dual-SIM-triple-standby ("DSTS") communication devices.

Various embodiments may also be useful in multi-standby communication devices that individually include at least one subscription associated with two RATs that share a single RF resource (i.e., one transmit circuit and one receive circuit) to service the same subscription concurrently. Such multi-standby communication devices may include a single-radio LTE or "SRLTE" communication device that supports an LTE data RAT and a 1×CDMA/GSM RAT.

Various embodiments may also be useful in other multi-standby communication devices that individually include one subscription associated with two RATs that share an RF resource that includes two sets of receiver circuits and one set of transmit circuits. For example, these multi-standby communication devices may include a simultaneous-LTE or "SLTE" communication device that simultaneously supports an LTE data RAT and a 1×CDMA/GSM RAT In yet another example, various embodiments may be useful in multi-standby communication devices—sometimes referred to as SRLTE+GSM communication devices or DSTS communication devices—that individually include a first subscription associated with two RATs (e.g., an LTE data RAT and a 1×CDMA/GSM RAT) and a second subscription associated with a third, separate RAT (e.g., a stand-alone GSM RAT). In such multi-standby communication devices, the three individual RATs may share a single RF resource that includes one transmit circuit and one receive circuit. Further, various embodiments may be particularly useful in an SRLTE+GSM communication device that is able to receive streaming multimedia content via eMBMS.

In various embodiments, the activities of subscriptions and the RATs supporting the subscriptions may change during the ordinary course of operating on a mobile communication device, such as when a RAT ceases an active call and begins performing idle-mode operations or vice versa. Thus, an idle RAT at a first time may become an active RAT at a second time, and the active RAT at the first time may similarly become an idle RAT at a second or third time. Thus, while various embodiments may occasionally be described with reference to an idle RAT and an active RAT, the RATs may be referred to generally as a first RAT and a second RAT to reflect that the subscriptions' roles as an idle communication activity or an active communication activity may change.

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first multi-standby communication device 110 may be in communication with the first mobile network 102 through a cellular connection 132 to the first base station 130. The first multi-standby communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second multi-standby communication device 120 may similarly communicate with the first mobile network 102 through the cellular connection 132 to the first base station 130. The second multi-standby communication device 120 may also communicate with the second mobile network 104 through the cellular connection 142 to the second base station 140. The cellular connections 132 and 142 may be made through two-way wireless communication links, such as 4G, 3G, CDMA, TDMA, WCDMA, GSM, and other mobile telephony communication technologies.

While the multi-standby communication devices 110, 120 are shown connected to the first mobile network 102 and, optionally, to the second mobile network 104, in some embodiments (not shown), the multi-standby communication devices 110, 120 may include two or more subscriptions to two or more mobile networks and may connect to those subscriptions in a manner similar to those described above.

In some embodiments, the first multi-standby communication device 110 may optionally establish a wireless connection 152 with a peripheral device 150 used in connection with the first multi-standby communication device 110. For example, the first multi-standby communication device 110 may communicate over a Bluetooth® link with a Bluetooth-enabled personal computing device (e.g., a "smart watch"). In some embodiments, the first multi-standby communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second multi-standby communication device 120 may similarly be configured to connect with the peripheral device 150 and/or the wireless access point 160 over wireless links.

Figure 2:
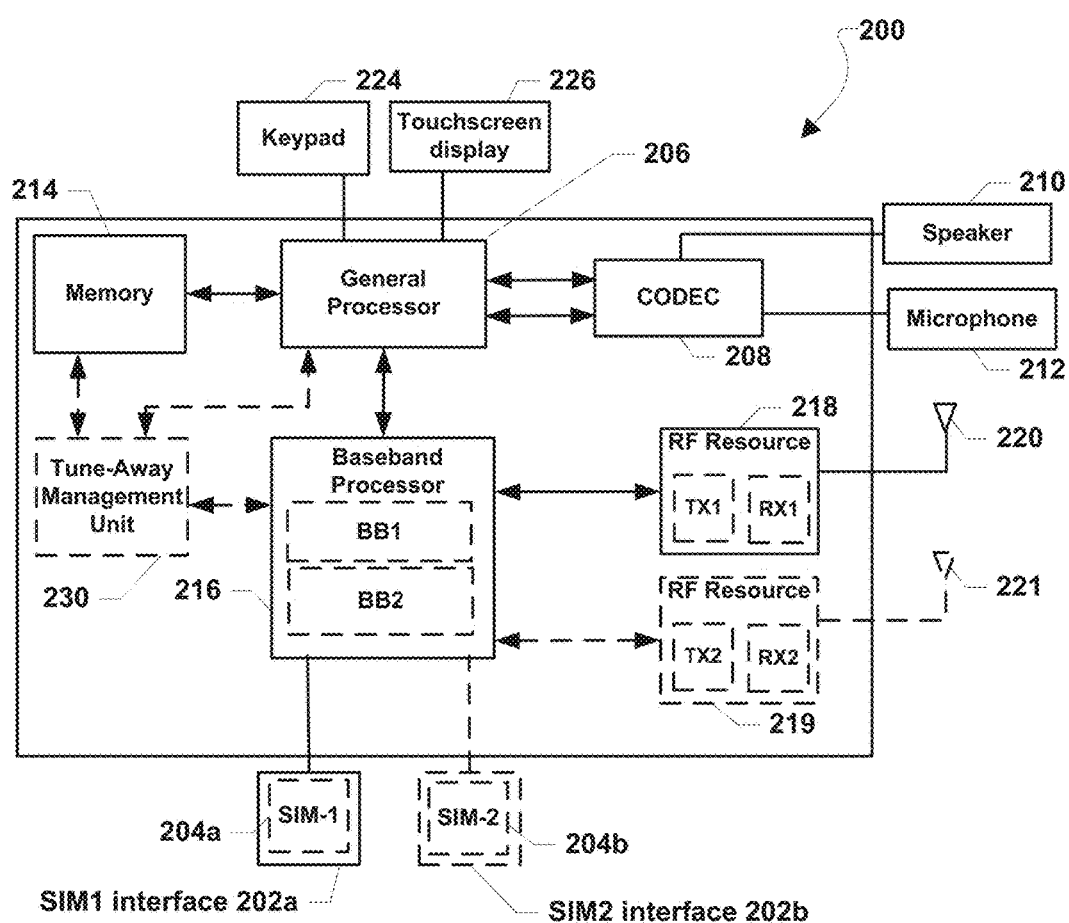
FIG. 2 is a component block diagram of a multi-standby communication device according to various embodiments.

FIG. 2 is a functional block diagram of a multi-standby communication device 200 suitable for implementing various embodiments. According to various embodiments, the multi-standby communication device 200 may be similar to one or more of the multi-standby communication devices 110, 120 as described with reference to FIG. 1. With reference to FIGS. 1-2, the multi-standby communication device 200 may include a first SIM interface 202a, which may receive a first identity module SIM-1 204a that is associated with a first subscription. The multi-standby communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or USIM applications, enabling access to, for example, GSM and/or UMTS networks. The UICC may also provide storage for a phone book and other applications. Alternatively, in a CDMA network, a SIM may be a UICC removable user identity module (RUIM) or a CDMA subscriber identity module (CSIM) on a card. A SIM card may have a CPU, ROM, RAM, EEPROM and I/O circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification. However, a SIM may be implemented within a portion of memory of the multi-standby communication device 200 (e.g., in a memory 214), and thus need not be a separate or removable circuit, chip or card.

The multi-standby communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain.

The memory 214 may store an operating system (OS), as well as user application software and executable instructions. The memory 214 may also store application data, such as an array data structure.

The general processor 206 and the memory 214 may each be coupled to at least one baseband modem processor 216. Each SIM and/or RAT in the multi-standby communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218, 219). In some embodiments, baseband-RF resource chains may share the baseband modem processor 216 (i.e., a single device that performs baseband/modem functions for all RATs on the multi-standby communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the multi-standby communication device. The RF resource 218 may include separate transmit and receive circuitry, or may include a transceiver that combines transmitter and receiver functions. In some embodiments, the RF resource 218 may include multiple receive circuitries. The RF resource 218 may be coupled to a wireless antenna (e.g., a wireless antenna 220). The RF resource 218 may also be coupled to the baseband modem processor 216.

In some optional embodiments, the multi-standby communication device 200 may include an optional RF resource 219 configured similarly to the RF resource 218 and coupled to an optional wireless antenna 221. In such embodiments, the multi-standby communication device 200 may leverage the multiple RF resources 218, 219 and antennae 220, 221 to perform diversity receiver ("DRx") reception during a tune-away event (see, e.g., FIG. 5).

In some embodiments, the general processor 206, the memory 214, the baseband processor(s) 216, and the RF resources 218, 219 may be included in the multi-standby communication device 200 as a system-on-chip 250. In some embodiments, the first and second SIMs 204a, 204b and their corresponding interfaces 202a, 202b may be external to the system-on-chip 250. Further, various input and output devices may be coupled to components on the system-on-chip 250, such as interfaces or controllers. Example user input components suitable for use in the multi-standby communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the multi-standby communication device 200 to enable communication between them, as is known in the art.

Functioning together, the two SIMs 204a, 204b, the baseband processor BB1, BB2, the RF resources 218, 219, and the wireless antennas 220, 221 may constitute two or more radio access technologies (RATs). For example, the multi-standby communication device 200 may be a SRLTE communication device that includes a SIM, baseband processor, and RF resource configured to support two different RATs, such as LTE and GSM. More RATs may be supported on the multi-standby communication device 200 by adding more SIM cards, SIM interfaces, RF resources, and antennae for connecting to additional mobile networks.

In some embodiments (not shown), the multi-standby communication device 200 may include, among other things, additional SIM cards, SIM interfaces, a plurality of RF resources associated with the additional SIM cards, and additional antennae for supporting subscriptions communications with additional mobile networks.

The multi-standby communication device 200 may optionally include a tune-away management unit 230 configured to manage the respective access of RATs associated with the first and second SIMs 204a, 204b to the RF resource 218 (and optionally the RF resource 219) in anticipation of or during a tune-away event. In some embodiments, the tune-away management unit 230 may determine whether to initiate a tune away from a first RAT to a second RAT, whether to prevent such a tune away, and/or whether to implement various other tune-away management strategies as described (see, e.g., FIGS. 4-10) in order to reduce the overall amount of redundancy information that is needed to correct/replace data for the first RAT that is not received or that is partially received as a result of tuning away from the first RAT to the second RAT. In some embodiments, the tune-away management unit 230 may be implemented within the general processor 206. In other embodiments, the tune-away management unit 230 may be implemented as a separate hardware component (i.e., separate from the general processor 206). In yet other embodiments, the tune-away management unit 230 may be implemented as a software application stored within the memory 214 and executed by the general processor 206.

Figure 3:
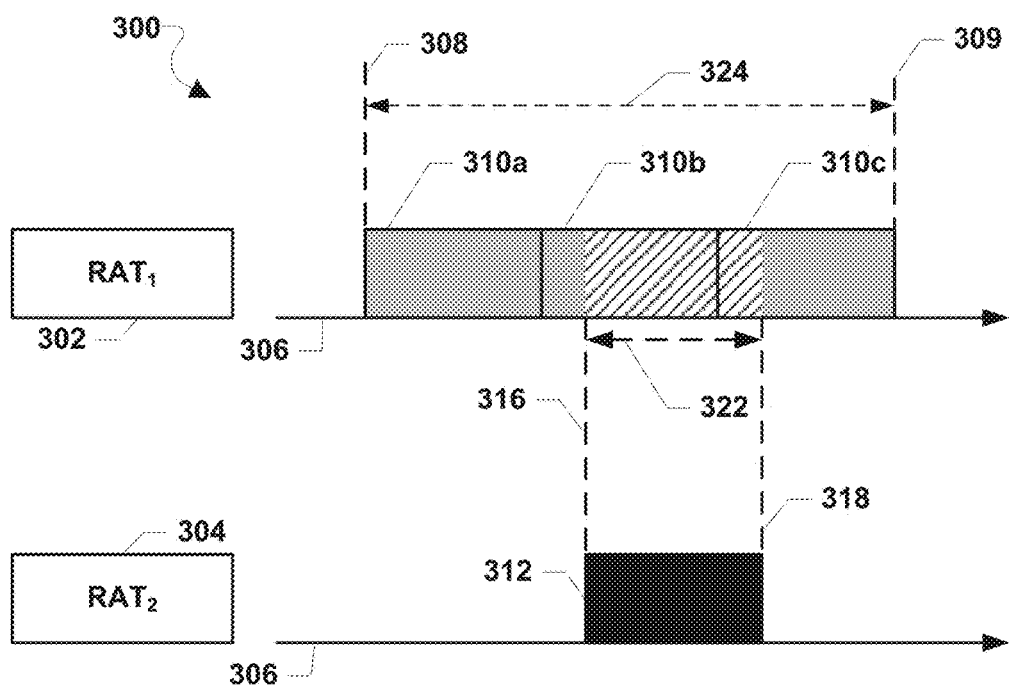
FIG. 3 is a timeline diagram illustrating reception activities of a first RAT and a second RAT sharing an RF resource during tune-away events.

FIG. 3 illustrates a timeline diagram 300 of a tune-away event occurring over time 306 between a first RAT 302 and a second RAT 304 sharing an RF resource (e.g., the RF resource 218 of FIG. 2) on the same multi-standby communication device (e.g., the multi-standby communication device 110, 120, 200 of FIGS. 1-2). In some embodiments, the first RAT 302 and second RAT 304 may be associated with the same subscription (e.g., on an SRLTE or SLTE communication device) or with different subscriptions (e.g., on a DSDS communication device).

With reference to FIGS. 1-3, the first RAT 302 may enter or be placed in an active mode starting at a time 308, such as in response to initiating a data or voice call. At the time 308, the first RAT 302 may begin communicating with its network, for example, by receiving mobile television broadcast content segments 310a-310c via eMBMS. The first RAT 302's reception activities while in the active mode may continue until a time 309, at which point the first RAT 302 may exit the active mode, such as when the current data call of the first RAT 302 ends.

While the first RAT 302 is active (i.e., a duration 324), the second RAT 304 may be in an idle-standby mode, during which time the second RAT 304 may not need regular access to the RF resource shared with the first RAT 302. However, as described, the second RAT 304 may occasionally need to perform various tune-away operations in order to monitor for pages from a mobile network in order to stay connected to that network, to take cell reselection measurements to determine whether to reselect to a neighboring cell, to provide updated location information to the mobile network of the second RAT 304 for location services, etc. The tune-away operations of the second RAT 304 may require different amounts of time to complete (e.g., 80 ms to complete page monitoring and approximately 200 ms to complete cell reselection measurements), and some operations may be cyclical in nature (e.g., discontinuous reception).

In the example illustrated in the timeline diagram 300, while the first RAT 302 is active for the duration 324, the second RAT 304 may be scheduled to perform wireless operations requiring a tune-away, referred to as tune-away operations 312, starting at a time 316. At the time 316, the multi-standby communication device may initiate a tune away from the first RAT 302 to the second RAT 304, thereby stopping or interrupting the first RAT 302's reception activities and enabling the second RAT 304 to use the shared RF resource to perform the tune-away operations 312 until a time 318 (i.e., a tune-away event 322). For example, the second RAT 304 may receive access to the shared RF resource for the duration of the tune-away event 322 in order to monitor for pages from the mobile network of the second subscription 304.

During the tune-away event 322, the first RAT 302 may be unable to receive data, information, content, etc. from its network, thereby potentially degrading the performance of the first RAT 302. In the timeline diagram 300, the first RAT 302 may be attempting to receive the data segments 310a-310c for play out to the user. As indicated by the discolored portions of the segments 310b, 310c, the first RAT 302 may lose some or all of the data included in the segments 310b, 310c during the tune-away event 322 because the first RAT 302 does not have access to the shared RF resource and thus cannot receive data in the segments 310b, 310c during that time period.

As described, the network may include redundancy information in each of the segments 310a-310c to enable the multi-standby communication device to recover any data for each of the segments 310a-310c that is lost or partially received as a result of the tune-away event 322. However, in the timeline diagram 300, a substantial amount of redundancy information will be required to be included in each segment in order to ensure that the performance of the first RAT 302 is maintained at a satisfactory level in certain situations in which most or a significant amount of segment data is lost (e.g., the data in segment 310b).

While more redundancy information may be included in segments to accommodate lost or partially received data resulting from tune-away events, introducing more redundancy information in the data sent to a multi-standby communication device results in higher latency as more information must be sent over the network, resulting in an overall worse channel condition. To address this problem, a multi-standby communication device (e.g., the multi-standby communication device 110, 120, 200 of FIGS. 1-2) may implement various tune-away management strategies (e.g., those described with reference to FIGS. 4-10) to improve the data reception of a first RAT that is affected by tune-away events as described without requiring an substantial increase in the amount of redundancy information as is currently needed by conventional communication devices.

Figure 4:
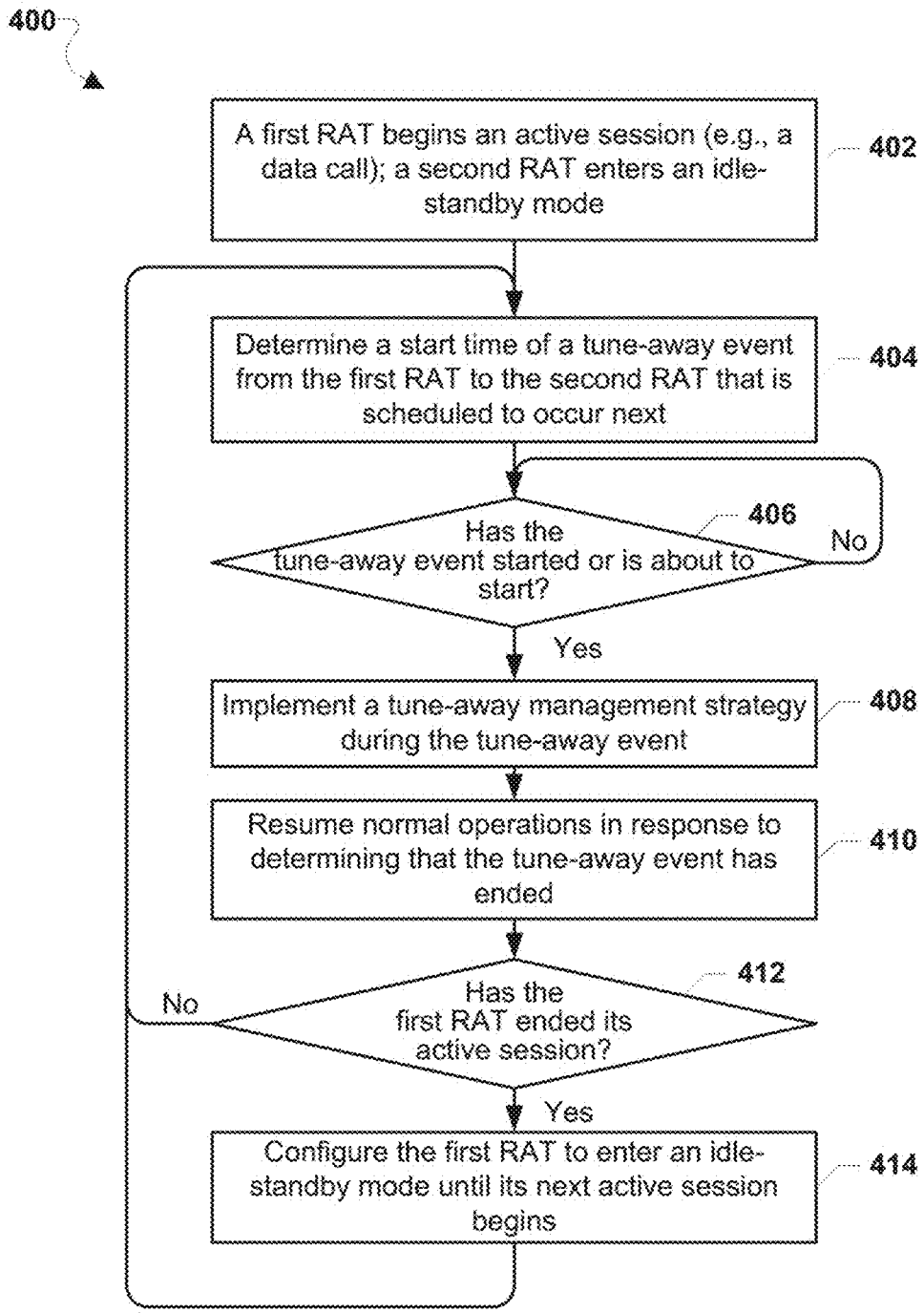
FIG. 4 is a process flow diagram illustrating a method for implementing a tune-away management strategy during a tune-away event according to various embodiments.

FIG. 4 illustrates a method 400 for implementing a tune-away management strategy in order to improve the reception ability of a first RAT supporting a first subscription during a tune-away event, according to some embodiments. The method 400 may be implemented with a processor (e.g., the general processor 206 of FIG. 2, the baseband modem processor 216, the tune-away management unit 230, a separate controller, and/or the like) of a multi-standby communication device (such as the multi-standby communication device 200 described with reference to FIG. 2) that supports two RATs sharing one RF resource for implementing a tune-away management strategy in order to improve the reception ability of a first RAT during a tune-away event. With reference to FIGS. 1-4, the device processor may begin performing the operations of the method 400 in response to the first RAT beginning an active session (e.g., a data or voice call) and/or a second RAT entering an idle-standby mode in block 402.

In block 404, the device processor may determine a start time of a tune-away event from the first RAT to the second RAT that is scheduled to occur next. In some embodiments, the device processor may receive this scheduling information from the second RAT, from the second RAT's network, or various other sources.

In determination block 406, the device processor may determine whether the tune-away event has started or is about to start. Until the tune-away event starts or is about to start (i.e., while determination block 406="No"), the device processor may continue to monitor a timer to determine when the tune-away event has started or is about to start.

In response to determining that a tune-away event has started or is about to start (i.e., determination block 406="Yes"), the device processor may implement a tune-away management strategy during the tune-away event in block 408. In various embodiments, the operations of block 408 may include operations performed in one or more of methods 408a-408f (see, e.g., FIGS. 5-10). In some embodiments, the device processor may implement the tune-away management strategy during the tune-away event in order to improve the first RAT's reception of data, thereby decreasing the first RAT's reliance on redundancy information sent from the network to correct or recovery lost or partially received data. In such embodiments, implementing the tune-away management strategy may especially improve the first RAT's reception of broadcast services (e.g., data received via eMBMS, such as live video streaming) because such broadcast services received via one-to-many transmissions may be comparatively more difficult to correct/recover than typical unicast data (e.g., data for e-mail, video-on-demand, etc.) sent specifically from the first subscription's network to the first subscription supported by the first RAT via a one-to-one transmission. For example, a RAT can immediately request a retransmission of a unicast data packet that is lost due to a tune away, but a RAT will have to wait until the next scheduled broadcast cycle to receive a retransmission of a lost broadcast data packet.

In block 410, the device processor may resume normal operations in response to determining that the tune-away event has ended. In some embodiments, the device processor may configure the first RAT and the second RAT to resume normal operations, such as by tuning back from the second RAT to the first RAT to enable the first RAT to continue receiving data from its network.

In determination block 412, the device processor may determine whether the first RAT has ended its active session, such as the active session initiated in block 402. In other words, the device processor may determine whether the first RAT still requires primary or exclusive access to the shared RF resource to service a voice or data call, for example.

In response to determining that the first RAT's active session has not ended (i.e., determination block 412="No"), the device processor may repeat the above operations of the method 400 in a loop in block 404 by determining a start time of another tune-away event from the first RAT to the second RAT that is scheduled to occur next.

In response to determining that the first RAT has ended its active session (i.e., determination block 412="Yes"), the device processor may configure the first RAT to enter an idle-standby mode until its next active session begins in block 414. In response to determining that the next active session of the first RAT has begun, the device processor may again determine a start time of a tune-away event from the first RAT to the second RAT that is scheduled to occur next in block 404 and repeat the operations in method 400 as described.

Figure 5:
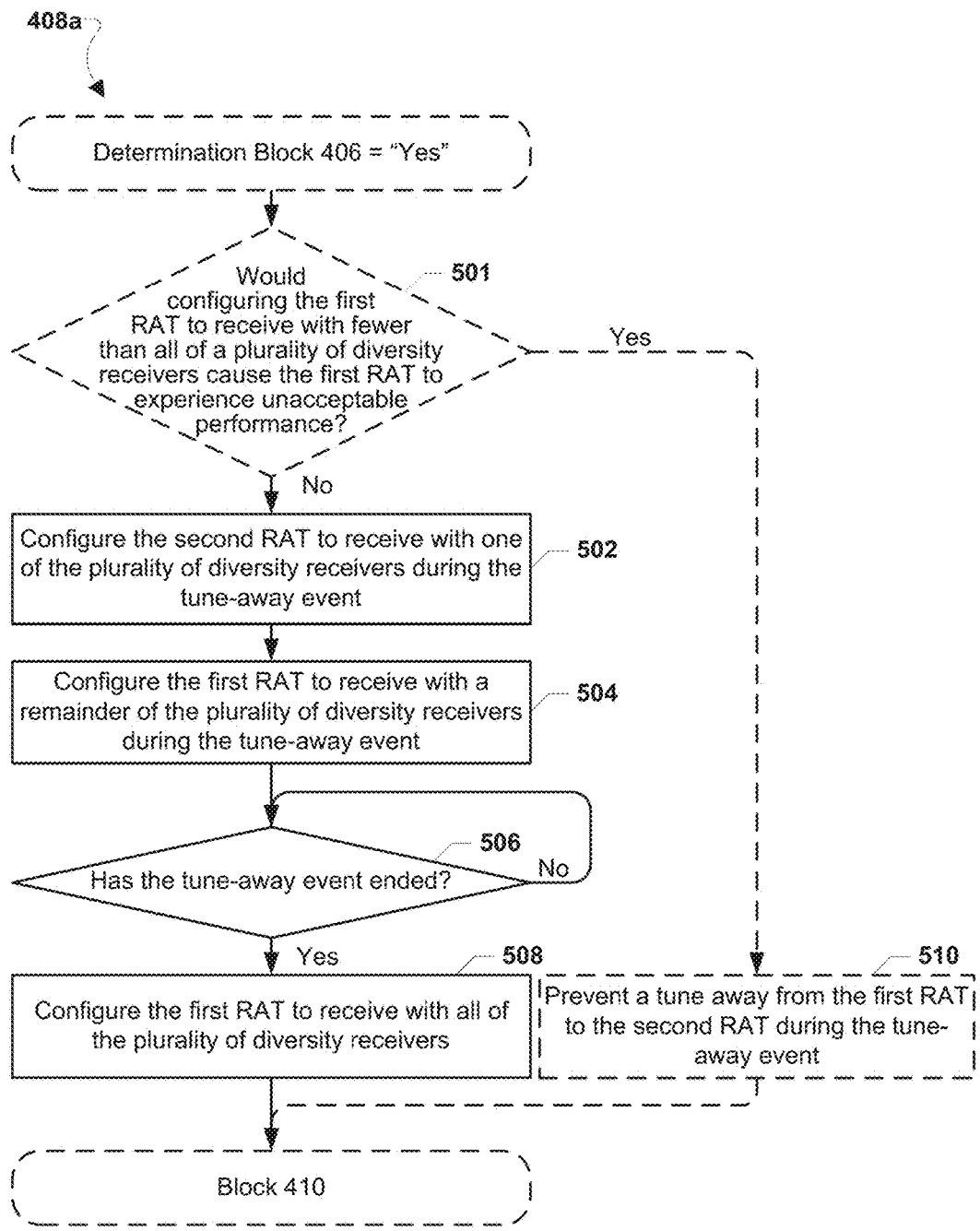
FIG. 5 is a process flow diagram illustrating a method for implementing a tune-away management strategy during a tune-away event by configuring a second RAT to utilize one of a plurality of diversity receivers and configuring the first RAT to utilize a remainder of the plurality of diversity receivers according to various embodiments.

FIG. 5 illustrates the method 408a for configuring a first subscription and a second subscription to use different diversity receivers during a tune-away event according to some embodiments. The method 408a may be implemented with a processor (e.g., the general processor 206 of FIG. 2, the baseband modem processor 216, the tune-away management unit 230, a separate controller, and/or the like) of a multi-standby communication device (e.g., the multi-standby communication device described with reference to FIG. 2). In some optional embodiments, the operations of the method 408a may implement embodiments of the operations of block 408 of the method 400 described with reference to FIG. 4. Thus, with reference to FIGS. 1-5, the device processor may optionally begin performing operations of the method 408a in response to determining that a tune-away event has started or is about to start (i.e., determination block 406="Yes").

In some conventional designs, a multi-standby communication device may include a plurality of diversity receivers (i.e., two or more receive circuits and/or antennae, such as the RF resources 218, 219 and antennae 220, 221 in FIG. 2). Typically, an active first RAT (e.g., an LTE RAT) operating on such conventional multi-standby communication devices utilizes all of the plurality of diversity receivers until a tune-away event occurs, at which time all of the plurality of diversity receivers are reallocated to an idle, second RAT (e.g., a GSM RAT) for the duration of the tune-away event. Thus, during the tune-away event, the first RAT's reception activities are interrupted or ceased, potentially degrading the first RAT's overall performance substantially. At the conclusion of the tune-away event, all of the diversity receivers are returned to supporting the first RAT.

In contrast to current designs, some embodiments enable the first RAT and the second RAT to each receive data during a tune-away event by leveraging the availability of a plurality of diversity receivers on the multi-standby communication device. Specifically, the device processor may configure each of the first RAT and the second RAT to receive using a separate diversity receiver, thereby ensuring that the reception performance for the first RAT is not affected or is only slightly affected during a tune-away event, while still enabling the second RAT to perform tune-away operations (e.g., system information monitoring, etc.).

In some optional embodiments, the device processor may determine whether configuring the first RAT to receive with fewer than all of the plurality of diversity receivers on the multi-standby communication device during the tune-away event would cause the first RAT to experience unacceptable performance, in optional determination block 501. For example, configuring the first RAT to receive with only one of two diversity receivers may substantially degrade the first RAT's reception performance (e.g., may downgrade the quality of eMBMS services) because, instead of receiving data/information with two receivers, the first RAT is limited to only one receiver, which may cause the first RAT's block error rate to rise. In some embodiments (see, e.g., FIG. 6), the determination made in optional determination block 501 may be based on a number of symbols of a current segment of data/content that has already been received for the first RAT, a number of symbols of the current segment remaining to be received, a number of symbols of the current segment estimated to be lost during the tune-away event as a result of limiting the first RAT to fewer than all diversity receivers, and a threshold number of symbols needed to decode the current segment, as well as channel or link quality.

In response to determining that configuring the first RAT to receive with fewer than all of the plurality of diversity receivers during the tune-away event would cause the first RAT to experience unacceptable performance (i.e., optional determination block 501="Yes"), the device processor may optionally prevent a tune away from the first RAT to the second RAT during the tune-away event, in optional block 510. In other words, in response to determining that the first RAT's reception performance may be unacceptably degraded even when the first RAT loses access to only one diversity receiver, for example, the device processor may skip conducting the tune away. In some embodiments (not shown), rather than skipping the tune-away event, the device processor may reschedule the tune-away event to occur during a time when the first RAT's reception performance may not be affected as much by momentarily losing receive diversity (see, e.g., FIG. 9).

In response to determining that configuring the first RAT to receive with fewer than all of the plurality of diversity receivers on the multi-standby communication device during the tune-away event would not cause the first RAT to experience unacceptable performance (i.e., optional determination block 501="No"), the device processor may configure the second RAT to receive with one of the plurality of diversity receivers during the tune-away event in block 502, thereby enabling the second RAT to perform various tune-away operations during the tune-away event without preventing the first RAT from also receiving during the tune-away event.

In block 504, the device processor may configure the first RAT to receive with the remaining diversity receivers that are not allocated to the second RAT during the tune-away event (i.e., a remainder of the plurality of diversity receivers). In some embodiments, at times other than during a tune-away event, the first RAT may have access to all diversity receivers while in an active session, such as in a voice or data call, thereby improving the reception performance of the first RAT.

In determination block 506, the device processor may monitor for when the tune-away event has ended. In some embodiments, the device processor may determine the end time of the tune-away event and/or may receive such information from various sources, including the second RAT, the second RAT's network, etc. Until the tune-away event has ended (i.e., while determination block 506="No"), the device processor may continue to monitor the end of the tune-away event.

In response to determining that the tune-away event has ended (i.e., determination block 506="Yes"), the device processor may configure the first RAT to receive with all of the plurality of receivers in block 508, thereby improving the reception quality and performance of the first RAT.

Regardless of whether the device processor configures the first RAT to receive with all of the plurality of diversity receivers in block 508 or prevents the tune away in optional block 510, in some embodiments, the device processor may continue performing the operations in block 410 of the method 400 by resuming normal operations in response to determining that the tune-away event has ended.

Figure 6:
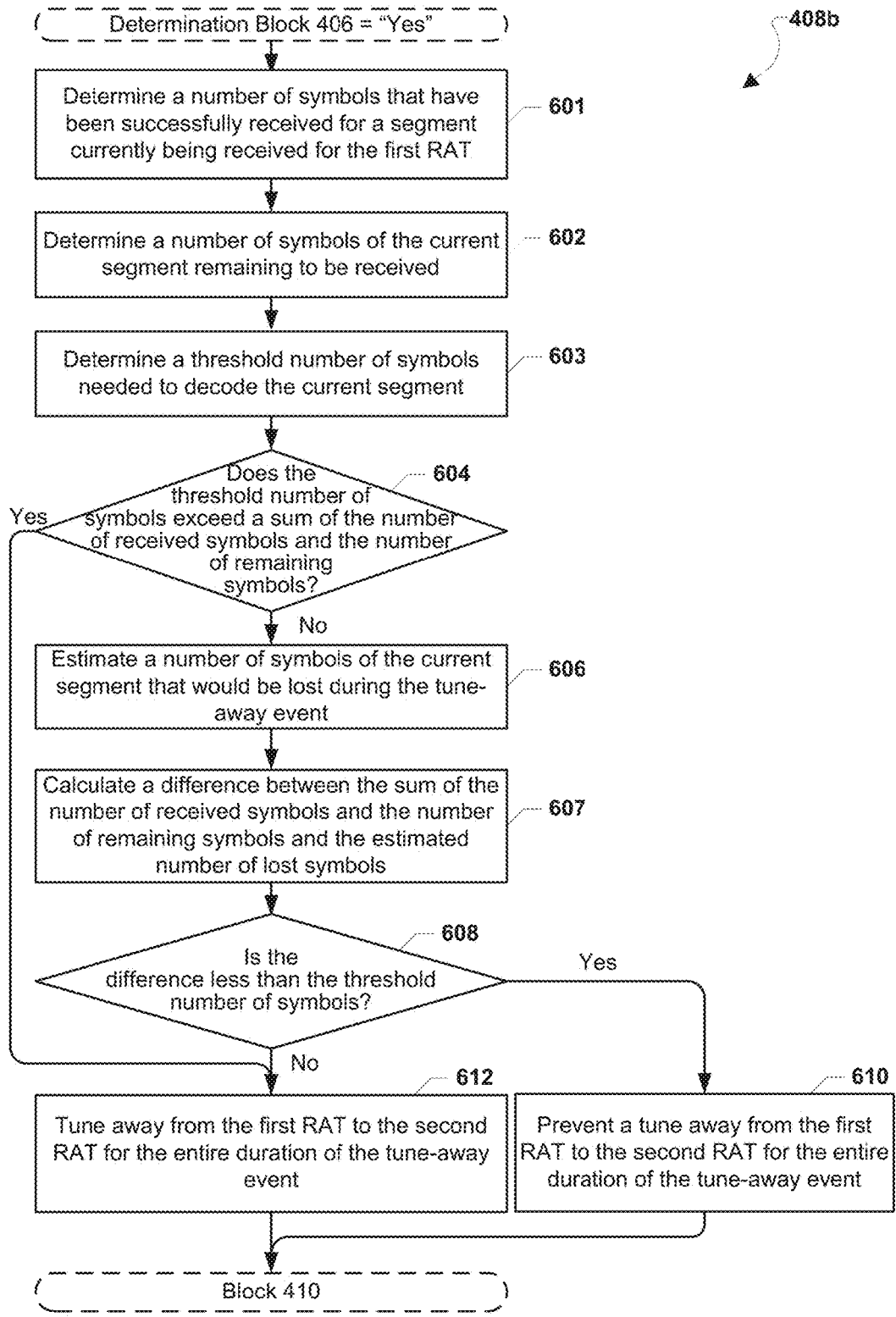
FIG. 6 is a process flow diagram illustrating a method for implementing a tune-away management strategy by preventing a tune away from a first RAT to a second RAT based on an amount of segment data the first RAT has already received by the start of the tune-away event or could receive during the tune-away event according to various embodiments.

FIG. 6 illustrates a method 408b for determining whether to tune away during a tune-away event according to some embodiments. The method 408b may be implemented with a processor (e.g., the general processor 206 of FIG. 2, the baseband modem processor 216, the tune-away management unit 230, a separate controller, and/or the like) of a multi-standby communication device (e.g., the multi-standby communication device 200 described with reference to FIG. 2). In some optional embodiments, the operations of the method 408b may implement embodiments of the operations of block 408 of the method 400. Thus, with reference to FIGS. 1-6, in such optional embodiments, the device processor may begin performing operations of the method 408b in response to determining that a tune-away event has started or is about to start (i.e., determination block 406="Yes").

In block 601, the device processor may determine a number of symbols that have been received for a segment currently being received for the first RAT. For example (see, e.g., FIG. 3), the device processor may be receiving a segment of multimedia broadcast content (e.g., mobile TV) for the first RAT over an LTE network connection (e.g., via eMBMS). In some embodiments, the segment currently being received on the multi-standby communication device for a first RAT (i.e., sometimes referred to as the "current" segment) may include a number of redundancy symbols (i.e., "N" redundancy symbols) generated by an FEC code, such as Raptor or RaptorQ code, and a number of source symbols (i.e., "K" source symbols). The device processor may also determine a number of symbols of the current segment that remain to be received in block 602.

In some embodiments of the operations performed in blocks 601 and 602, the device processor may estimate an overhead rate of the current segment's FEC based on previously received segments that have been received over the same multi-cast traffic channel (MTCH). Thus, the device processor may estimate the number of received symbols in block 601, and the number of remaining symbols to be received in block 602 based on the overhead rate. In some embodiments, the device processor may also determine the block error rate (BLER) and may determine the number of remaining symbols that need to be received in light of the determined BLER. For example, the device processor may estimate the BLER from a modulation and coding scheme (MCS) and a measured multicast-broadcast-single-frequency network's reference signal received quality (RSRQ) and reference signal received power (RSRP) measurements.

In block 603, the device processor may determine a threshold number of symbols that must be received (e.g., from the server/content provider) in order to decode the current segment for the first RAT. In an example, the threshold number of symbols may be equal to a certain multiplier times the number of source symbols of the current segment. For example, when RaptorQ FEC is utilized to send redundancy symbols to the multi-standby communication device, the threshold number of symbols may be equal to 1.02 times K symbols. In some embodiments, the multiplier may vary based on the FEC implementation (e.g., Raptor FEC code).

During a tune-away event, the multi-standby communication device may tune away from the first RAT, preventing the first RAT from receiving symbols for the current segment as the first RAT may have lost access to its shared RF resource during the event. Thus, the device processor may need to determine whether allowing a tune away to a second RAT from the first RAT during the tune-away event would prevent the multi-standby communication device from receiving at least the threshold number of symbols needed to decode the current segment.

In determination block 604, the device processor may determine whether the threshold number of symbols determined in block 603 (equals or) exceeds a sum of the number of received symbols determined in block 601 and the number of remaining symbols determined in block 602. In other words, the device processor may determine whether at least a threshold number of symbols needed to decode the current segment has already been received or could be received. Said another way, the device processor may determine whether it is already impossible to receive enough symbols to decode the current segment, which may indicate that initiating a tune away during the tune-away event will not worsen the first RAT's performance because the current segment will be lost regardless.

In response to determining that the threshold number of symbols does not exceed the sum (i.e., determination block 604="No"), the device processor may estimate a number of symbols of the current segment that would be lost during the tune-away event, in block 606. In some embodiments of the operations performed in block 606, the device processor may estimate the number of lost symbols based on an expected or estimated duration of the tune-away event. In some embodiments in which tune aways to the second RAT are supported using diversity receivers (see, e.g., FIG. 5), the device processor may estimate the number of lost symbols in consideration of a determined signal-to-noise ratio and block error rate during such tune-away events.

In block 607, the device processor may calculate a difference between the estimated number of lost symbols determined in block 606 and the sum of the number of received symbols and the number of remaining symbols. In some situations, the device processor may not have received a sufficient number of symbols to reliably decode the current segment, in which case the device processor may determine whether a sufficient number of remaining symbols can be received in the event that a tune away from the first RAT is initiated during the tune-away event. Thus, in some embodiments, the difference may indicate the total number of symbols expected to be received in light of initiating a tune away from the first RAT during the tune-away event.

In determination block 608, the device processor may determine whether the difference calculated in block 607 is less than the data amount threshold determined in block 603. In other words, the device processor may determine whether the multi-standby communication device would not receive at least the threshold number of symbols needed to decode the current segment as a result of initiating the tune away from the first RAT during the tune-away event.

In response to determining that the difference calculated in block 607 is less than the threshold number of symbols (i.e., determination block 608="Yes"), the device processor may prevent a tune away from the first RAT to the second RAT for the entire duration of the tune-away event in block 610. In other words, the device processor may determine not to tune away when it is possible to receive at least the threshold number of symbols needed to decode the current segment when the tune away is skipped. In some embodiments, the second RAT may receive retransmissions from its network of any paging messages missed as a result of preventing the tune away in block 610, and therefore, the second RAT's overall service may not be substantially interrupted/affected.

In response to determining that the difference is greater than or equal to the threshold number of symbols (i.e., determination block 608="No") or in response to determining that the threshold number of symbols exceeds the sum of the number of received and remaining symbols (i.e., determination block 604="No"), the device processor may tune away from the first RAT to the second RAT for the entire duration of the tune-away event in block 612. In other words, the device processor may initiate the tune away from the first RAT to the second RAT either when it is impossible to receive a sufficient number of symbols to decode the current segment even if the tune away from the first RAT to the second RAT is prevented (i.e., determination block 604="Yes"), or when at least a threshold number of symbols needed to decode the current segment has already been received or may be received despite tuning away during the tune-away event (i.e., determination block 608="Yes").

Regardless of whether the tune away is allowed in block 612 or prevented in block 610, in some optional embodiments, the device processor may continue performing the operations in block 410 of the method 400 by resuming normal operations in response to determining that the tune-away event has ended. For example, the device processor may initiate a tune back from the second RAT to the first RAT.

While the operations of the method 408b may be especially useful in improving the first RAT's performance during a tune-away event during which the second RAT is scheduled to perform paging operations, the above operations may similarly improve the performance of the first RAT when the second RAT is scheduled to perform various other (i.e., non-paging) operations during the tune-away event, such as system information monitoring, cell reselection measurements, etc.

Figure 7:
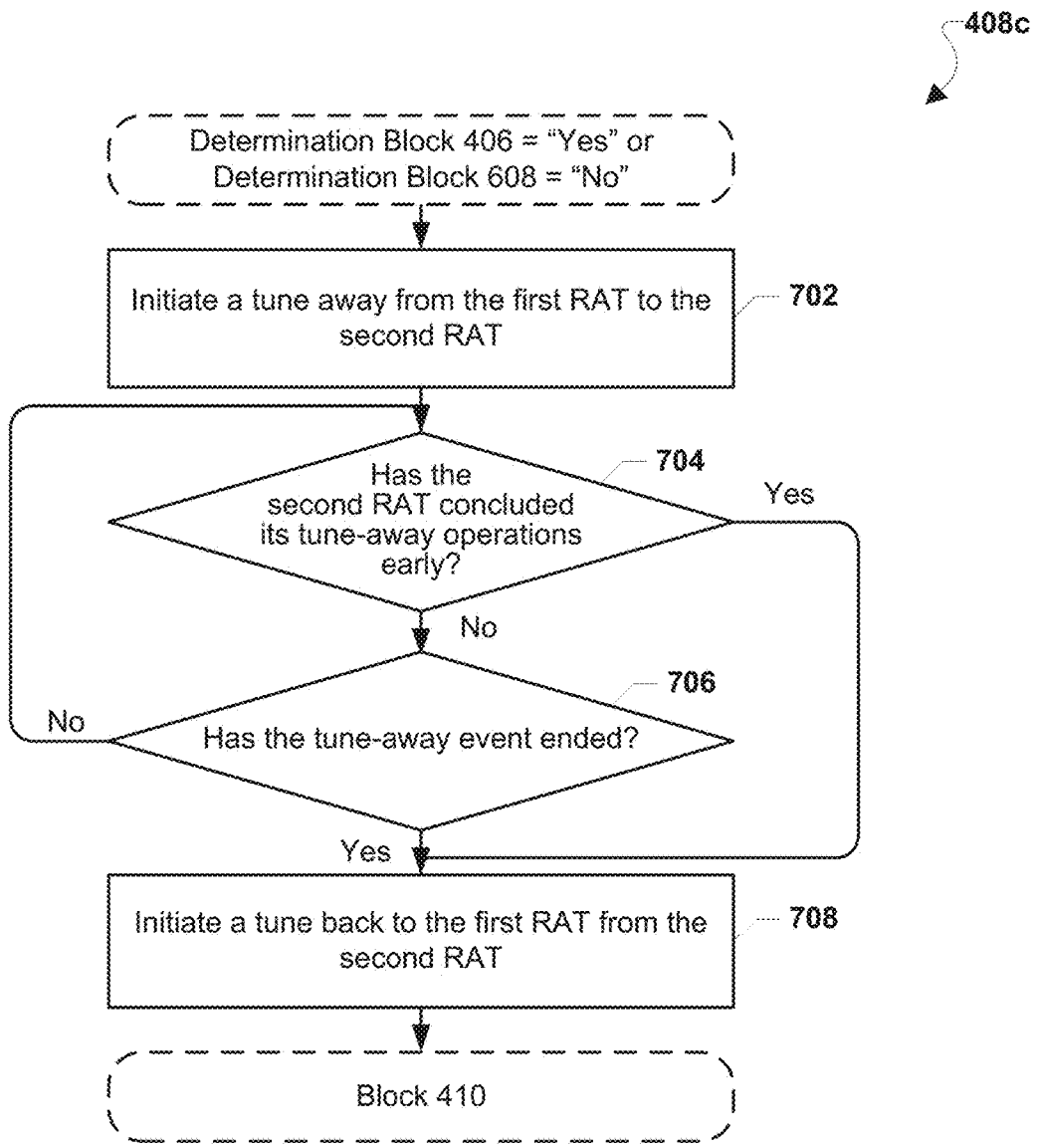
FIG. 7 is a process flow diagram illustrating a method for implementing a tune-away management strategy during a tune-away event by initiating a tune-back operation from a second RAT to a first RAT in response to determining that the second RAT's tune-away operations have ended early according to various embodiments.

FIG. 7 illustrates a method 408c for determining whether to tune back to the frequency band/channel of the first subscription before a tune-away event has ended according to some embodiments. The method 408c may be implemented with a processor (e.g., the general processor 206 of FIG. 2, the baseband modem processor 216, the tune-away management unit 230, a separate controller, and/or the like) of a multi-standby communication device (e.g., the multi-standby communication device described with reference to FIG. 2). In some optional embodiments, the operations of the method 408c may implement embodiments of the operations of block 408 of the method 400 as described with reference to FIG. 4. Thus, with reference to FIGS. 1-7, in such optional embodiments, the device processor may begin performing operations of the method 408c in response to determining that a tune-away event has started or is about to start (i.e., determination block 406="Yes").

In alternative embodiments, the operations of the method 408c may implement embodiments of the operations of block 610 of the method 408b. In such embodiments, the device processor may begin performing operations of the method 408c in response to determining that the estimated amount of segment data is greater than or equal to the data amount threshold (i.e., determination block 608="No").

In block 702, the device processor may initiate a tune away from the first RAT to the second RAT according to known operations.

In determination block 704, the device processor may determine whether the second RAT has concluded its tune-away operations early. In other words, the device processor may determine whether it is possible to tune back to the first RAT before the end of the tune-away event without negatively affecting the second RAT's operations. In some embodiments, the device processor may make this determination in response to receiving indications from the second RAT's network that the second RAT's tune-away operations have concluded. For example, the device processor may receive certain bits, flags, or other indications (e.g., "done" bits) included in a paging message received for the second RAT that indicate an early termination of the paging message, and therefore, the early termination of the second RAT's page-monitoring operations.

In response to determining that the second RAT has not concluded its tune-away operations early (i.e., determination block 704="No"), the device processor may determine whether the tune-away event has ended—for example, at an expected in time—in determination block 706. In response to determining that the tune-away event has not ended (i.e., determination block 706="No"), the device processor may repeat the above operations in a loop in determination block 704 by again determining whether the second RAT has concluded its tune-away operations early.

In response to determining that the second RAT has concluded its tune-away operations early (i.e., determination block 704="Yes") or in response to determining that the tune-away event has ended at its normal or expected end time (i.e., determination block 706="Yes"), the device processor may initiate a tune back to the first RAT from the second RAT in block 708. Thus, by monitoring for and detecting an early termination of the second RATs tune-away operations, the device processor may enable the first RAT to resume its reception activities sooner, therefore decreasing the amount of data that is lost or partially received and the amount of redundancy information that is needed to recover that lost or partially received data.

In some embodiments, the device processor may continue performing the operations in block 410 of the method 400 by resuming normal operations in response to determining that the tune-away event has ended.

Figure 8:
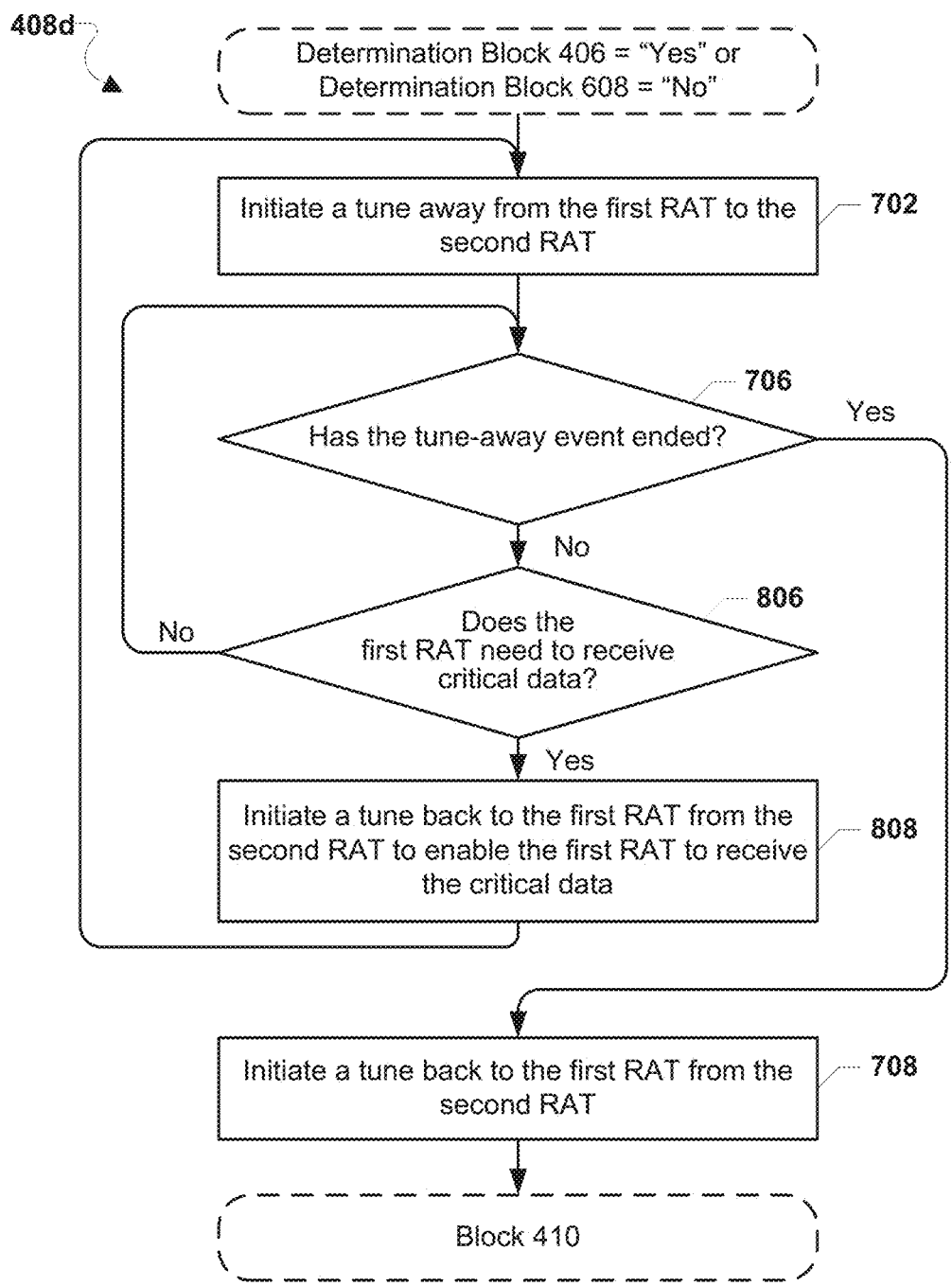
FIG. 8 is a process flow diagram illustrating a method for implementing a tune-away management strategy during a tune-away event by performing a temporary tune-back operation from a second RAT to a first RAT to enable the first RAT to receive critical data according to various embodiments.

FIG. 8 illustrates a method 408d for determining whether to tune back to the first RAT from the second RAT in order to enable the first RAT to receive critical or time sensitive information from its network during a tune-away event, according to some embodiments. The method 408d may be implemented with a processor (e.g., the general processor 206 of FIG. 2, the baseband modem processor 216, the tune-away management unit 230, a separate controller, and/or the like) of a multi-standby communication device (e.g., the multi-standby communication device described with reference to FIG. 2). In some optional embodiments, the operations of the method 408d may implement embodiments of the operations of block 408 of the method 400 as described with reference to FIG. 4. Thus, with reference to FIGS. 1-8, in such optional embodiments, the device processor may begin performing operations of the method 408d in response to determining that a tune-away event has started or is about to start (i.e., determination block 406="Yes").

In alternative embodiments, the operations of the method 408d may implement embodiments of the operations of block 610 of the method 408b. In such embodiments, the device processor may begin performing operations of the method 408d in response to determining that the estimated amount of segment data is greater than or equal to the data amount threshold (i.e., determination block 608="No").

In block 702, the device processor may initiate a tune away from the first RAT to the second RAT as described (see, e.g., block 702 described with reference to the method 408c).

In determination block 706, the device processor may determine whether the tune-away event has ended, such as by performing operations similar to the operations of determination block 706 of the method 408c. Thus, in response to determining that the tune-away event has not ended (i.e., determination block 706="No"), the device processor may determine whether the first RAT needs to receive critical or time sensitive data in determination block 806. In some embodiments, the reception performance of the first RAT may be dramatically improved by ensuring that the first RAT is able to receive certain critical information that may otherwise be lost during the tune-away event. Further, the duration of the tune back to the first RAT may be short enough to enable the second RAT to resume its tune-away operations without significantly impairing the second RAT's performance or network connectivity.

In response to determining that the first RAT does not need to receive critical data (i.e., determination block 806="No"), the device processor may repeat the operations in determination block 706 by determining whether the tune-away event has ended. In response to determining that the first RAT does need to receive critical data (i.e., determination block 806="Yes"), the device processor may initiate a tune back to the first RAT from the second RAT to enable the first RAT to receive the critical data in block 808. In some embodiments, the tune back may be temporary and may last only as long as needed to receive the critical data for the first RAT. Thus, once the critical data is received, the device processor may again initiate a tune away from the first RAT to the second RAT in block 702 to enable the second RAT to finish its tune-away operations.

In response to determining that the tune-away event has ended (i.e., determination block 706="Yes"), the device processor may initiate a tune back to the first RAT from the second RAT in block 708 as described.

In some embodiments, the device processor may continue performing the operations in block 410 of the method 400 by resuming normal operations in response to determining that the tune-away event has ended.

Figure 9:
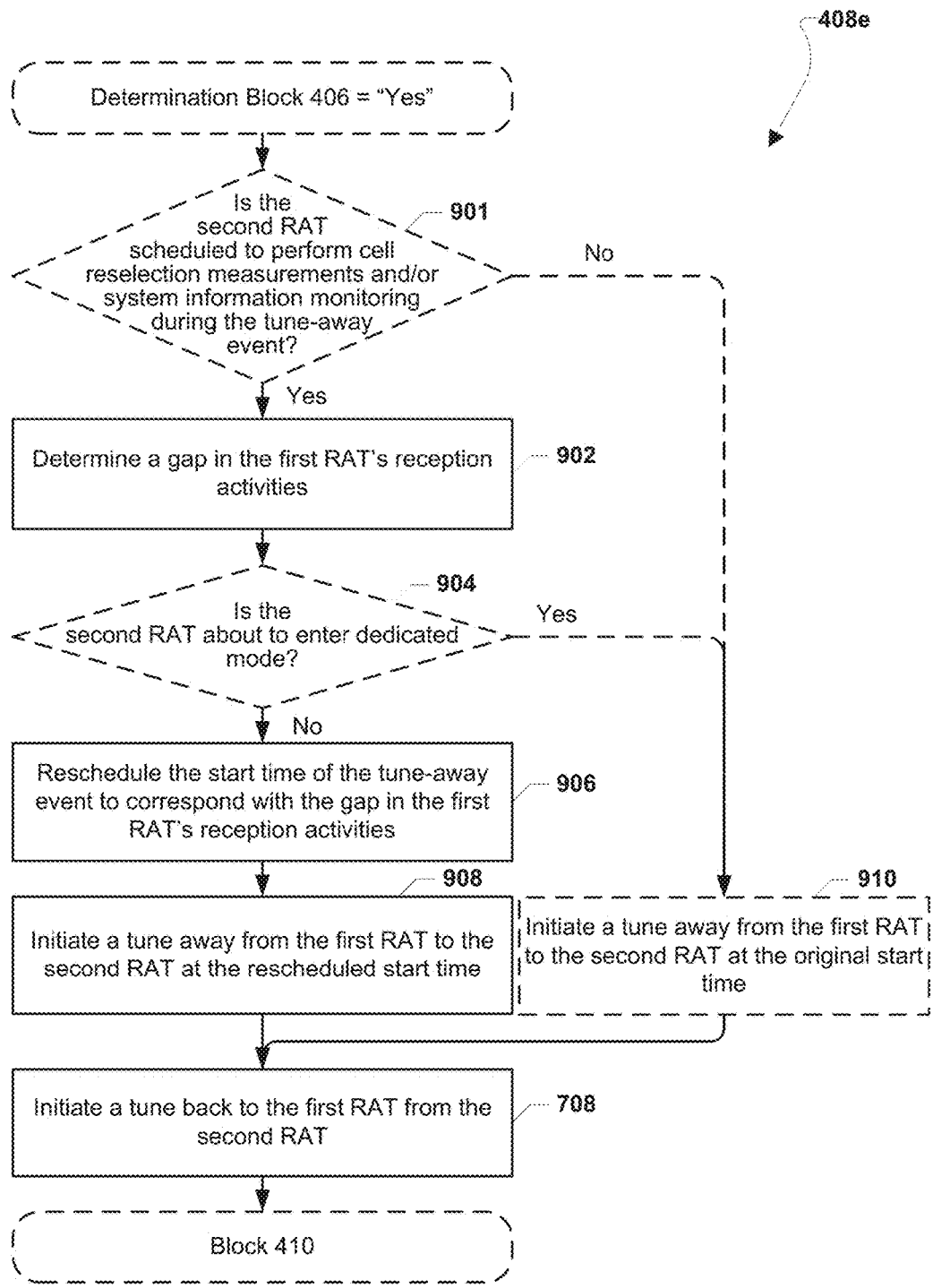
FIG. 9 is a process flow diagram illustrating a method for implementing a tune-away management strategy by rescheduling a start time of a tune-away event to correspond with a predetermined gap in a first RAT's reception activities according to various embodiments.

FIG. 9 illustrates a method 408e for rescheduling a tune-away event to begin at a time that corresponds with a gap in the first subscription's reception activities, according to some embodiments. The method 408e may be implemented with a processor (e.g., the general processor 206 of FIG. 2, the baseband modem processor 216, the tune-away management unit 230, a separate controller, and/or the like) of a multi-standby communication device (e.g., the multi-standby communication device described with reference to FIG. 2). In some optional embodiments, the operations of the method 408e may implement some embodiments of the operations of block 408 of the method 400 as described with reference to FIG. 4. Thus, with reference to FIGS. 1-9, in such optional embodiments, the device processor may begin performing operations of the method 408e in response to determining that a tune-away event has started or is about to start (i.e., determination block 406="Yes").

In optional determination block 901, the device processor may determine whether the second RAT is scheduled to perform cell reselection measurements and/or system information monitoring during the tune-away event. In some embodiments, the scheduling for the second RAT's cell reselection measurements and system information monitoring may be determined locally on the multi-standby communication device (i.e., not by the second RAT's network as is the case for page monitoring), thereby enabling the device processor to reschedule these particular activities to mitigate the effects of a tune away on a first RAT. Specifically, the device processor may selectively skip tune-away events in which the second RAT is scheduled to perform system information monitoring and/or cell reselection measurements and waiting to perform those operations during a time in which the first RAT's performance may be less affected.

In response to determining that the second RAT is scheduled to perform cell reselection measurements and/or system information monitoring during the tune-away event (i.e., optional determination block 901="Yes"), the device processor may determine a gap in the first RAT's reception activities, in block 902. For example, the first RAT may have regularly scheduled periods of time during which the first RAT is placed in a compressed mode and no data is received or transmitted for the first RAT.

In optional determination block 904, the device processor may optionally determine whether the second RAT is about to enter a dedicated mode, in contrast to an "idle" mode. In other words the device processor may determine whether the second RAT is about to be placed in an active session (e.g., a voice call).

In response to determining that the second RAT is about to enter a dedicated mode (i.e., optional determination block 904="Yes") or in response to determining that the second RAT is not scheduled to perform cell reselection measurements or system information monitoring during the tune-away event (i.e., optional determination block 901="No"), the device processor may optionally initiate a tune away from the first RAT to the second RAT at the original start time of the tune-away event in optional block 910. In some embodiments, the second RAT may need to perform certain tune-away operations at the original start time of the tune-away event in anticipation of entering a dedicated mode, and thus the tune-away event cannot be rescheduled without affecting or compromising the second RAT's ability to enter the dedicated mode. In other words, in such situations, the device processor may be unable to skip the originally scheduled tune-away event.

In response to determining that the second RAT is not about to enter the dedicated mode (i.e., optional determination block 904="No"), the device processor may reschedule the start time of the tune-away event to correspond with the determined gap in the first RAT's reception activities in block 906. For example, the device processor may reschedule the second RAT's system information monitoring operations to occur during a time in which the first RAT would not otherwise be receiving data from its network. In some embodiments, the device processor may configure the second RAT to skip an upcoming tune-away event by rescheduling the start time of the tune-away event to occur at the start time of the next tune-away event.

In block 908, the device processor may initiate a tune away from the first RAT to the second RAT at the rescheduled start time, thereby improving the first RAT's overall reception performance by ensuring that the tune-away event occurs during a gap in the first RAT's reception activities and not while the first RAT is attempting to receive information from its network. As a result, the first RAT may not need as much redundancy information overhead in order to recover lost or partially received data.

In response to initiating a tune away at the rescheduled start time in block 908 or at the original start time in optional block 910, the device processor may initiate a tune back to the first RAT from the second RAT in block 708, as described with reference to the method 408c.

In some embodiments, the device processor may continue performing the operations in block 410 of the method 400 by resuming normal operations in response to determining that the tune-away event has ended.

Figure 10:
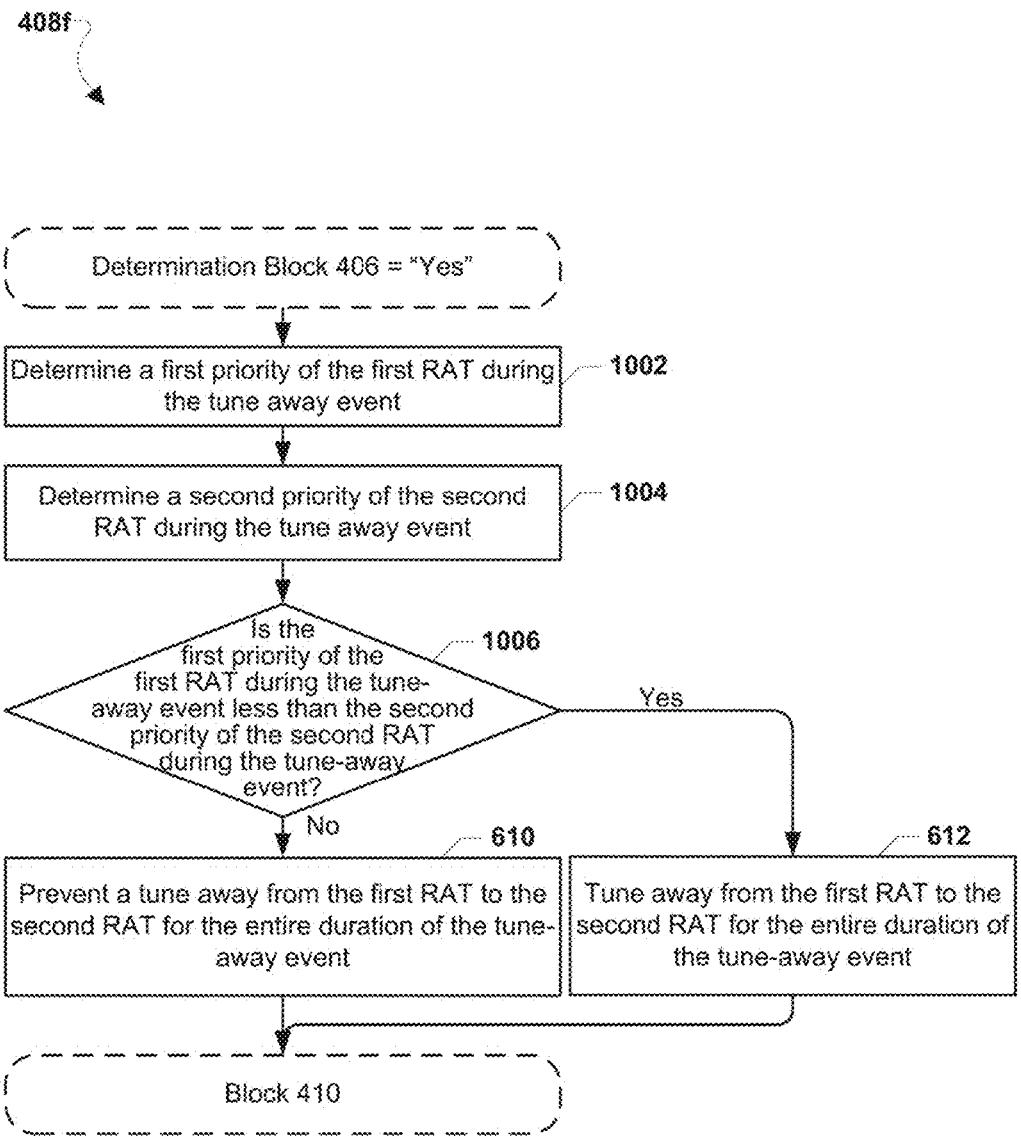
FIG. 10 is a process flow diagram illustrating a method for implementing a tune-away management strategy by preventing or initiating a tune away from a first RAT to a second RAT based on the RATs' respective priority according to various embodiments.

FIG. 10 illustrates a method 408f for determining whether to initiate a tune away based on the respective priorities of a first subscription and a second subscription, according to some embodiments. The method 408f may be implemented with a processor (e.g., the general processor 206 of FIG. 2, the baseband modem processor 216, the tune-away management unit 230, a separate controller, and/or the like) of a multi-standby communication device (e.g., the multi-standby communication device described with reference to FIG. 2). In some optional embodiments, the operations of the method 408f may implement embodiments of the operations of block 408 of the method 400 as described with reference to FIG. 4. Thus, with reference to FIGS. 1-10, in such optional embodiments, the device processor may begin performing operations of the method 408f in response to determining that a tune-away event has started or is about to start (i.e., determination block 406="Yes").

In block 1002, the device processor may determine a first priority of the first RAT during the tune-away event. Similarly, the device processor may determine a second priority of the second RAT during the tune-away event in block 1004.

In some embodiments, a RAT's priority may depend on whether the RAT is attempting to send or receive voice data, unicast data (i.e., typical packet-switched data received via a one-to-one communication link), or broadcast data (e.g., data received via an eMBMS link). In some examples, voice calls may be associated with a priority that is higher than the priority associated with broadcast data, and broadcast data may in turn be associated with a priority that is higher than the priority associated with typical unicast data. For example, a first RAT receiving a voice call may have a higher priority than a second RAT attempting to receive SMS messages during the tune-away event as the second RAT's network may resend the SMS messages at a later time without substantially affecting the second RAT's performance. In another example, a first RAT receiving eMBMS data may have a higher priority than a second RAT attempting to establish a voice call. In some embodiments, the priorities for each type of information may be configured, for example, by a user input, a network command, etc.

In determination block 1006, the device processor may determine whether the first priority of the first RAT during the tune-away event is less than the second priority of the second RAT during the tune-away event. In response to determining that the first priority of the first RAT is less than the second priority of the second RAT (i.e., determination block 1006="Yes"), the device processor may tune away from the frequency band/channel of the first RAT to the frequency band/channel of the second RAT for the entire duration of the tune-away event in block 612, such as by performing operations of block 612 as described with reference to the method 408*b*. In response to determining that the first priority of the first RAT is greater than or equal to the second priority of the second RAT (i.e., determination block 1006="No"), the device processor may prevent a tune away from the frequency band/channel of the first RAT to the frequency band/channel of the second RAT for the entire duration of the tune-away event in block 610.

In some embodiments, regardless of whether the device processor initiates or prevents a tune away in blocks 610, 612, the device processor may continue performing the operations in block 410 of the method 400 by resuming normal operations in response to determining that the tune-away event has ended.

In addition to, or instead of, implementing methods such as the methods 400 and 408*a*-408*f* on the multi-standby communication device, a server or network operator in communication with the multi-standby communication device may implement various changes to how redundancy information is sent to the multi-standby communication device (e.g., as described with reference to FIGS. 12-14) in order to enable the multi-standby communication device to recover data that is lost or partially received as a result of tune-away events without significantly increasing the amount of redundancy information that needs to be sent.

Figure 11:
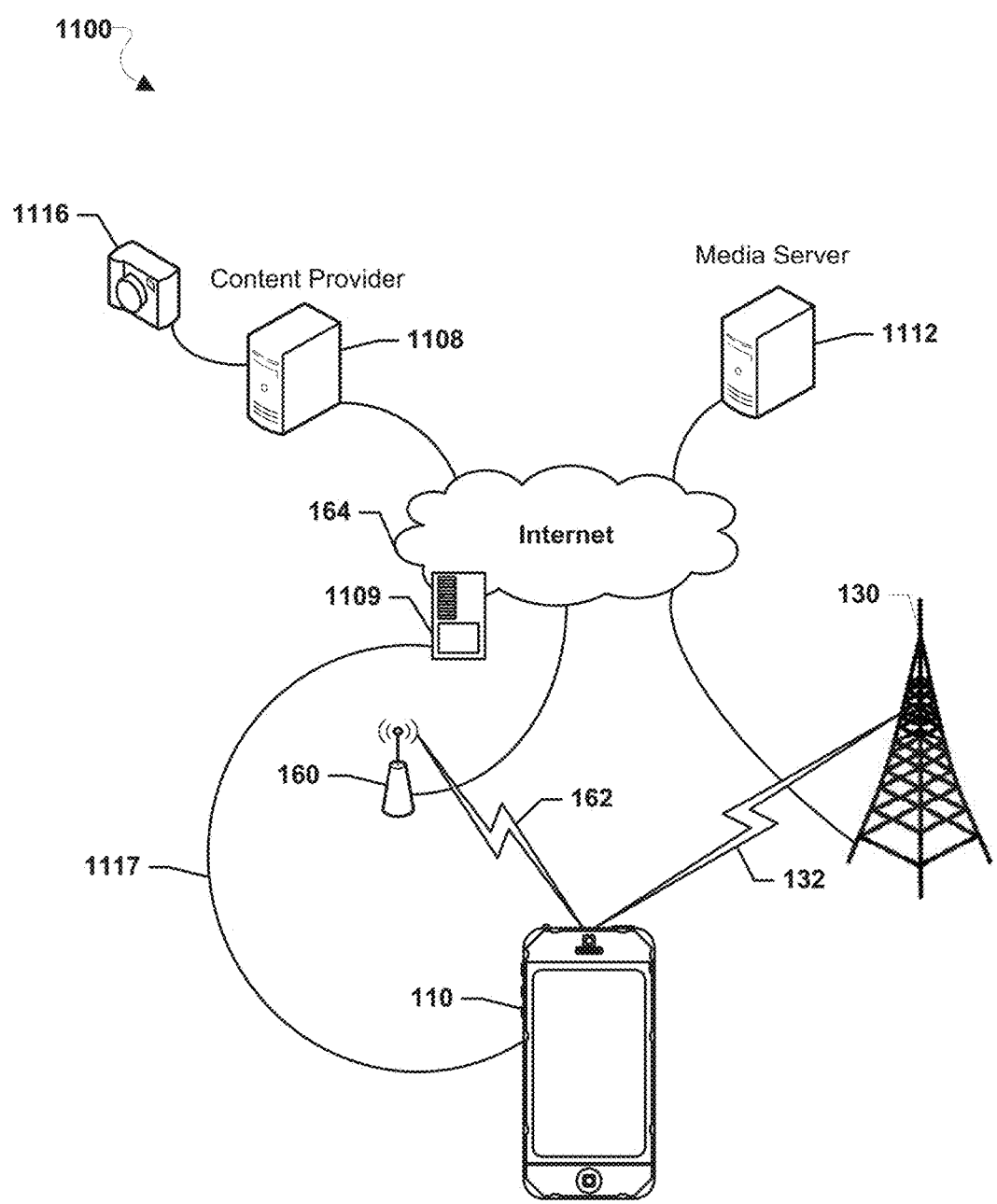
FIG. 11 is another communication system block diagram of a network including a server suitable for use with various embodiments.

FIG. 11 illustrates a communication network system 1100 suitable for use with some embodiments. With reference to FIGS. 1-11, the communication network system 1100 may include multiple receiver devices, such as the multi-standby communication device 110, one or more cellular towers or base stations (e.g., the base station 130), one or more wireless access points (e.g., the wireless access point 160), one or more routers 1109, and servers 1108 and 1112 connected to the Internet 164. The multi-standby communication device 110 may exchange data via one or more cellular connections 132, including CDMA, TDMA, GSM, PCS, 3G, 4G, LTE, or any other type of connection, with the cellular tower or base station 130. The cellular tower or base station 130 may be in communication with a router (not shown) which may connect to the Internet 164. The multi-standby communication device 110 may exchange data via one or more wireless connections 162, including Wi-Fi® or any other type connection, with the wireless access point 160. The wireless access point 160 may be in communication with a router (not shown) which may connect to the Internet 164. The multi-standby communication device 110 may exchange data via one or more wired connections 1117 with the router 1109, which may connect to the Internet 164. In this manner, via the connections to the cellular tower or base station 130, wireless access point 160, router 1109, and/or Internet 164, data may be exchanged between the multi-standby communication device 110 and the server(s) 1108 and 1112. In some embodiments, the server 1108 may be a content provider server and/or encoder providing media for output, for example, via a Dynamic Adaptive Streaming over HTTP or "DASH" client. In some embodiments, the server 1108 may receive the media from a media capture device 1116, such as a camera. In some embodiments, the server 1112 may be a media server that may receive media output from a content server or encoder and control the provisioning of media to the multi-standby communication device 110.

Figure 12:
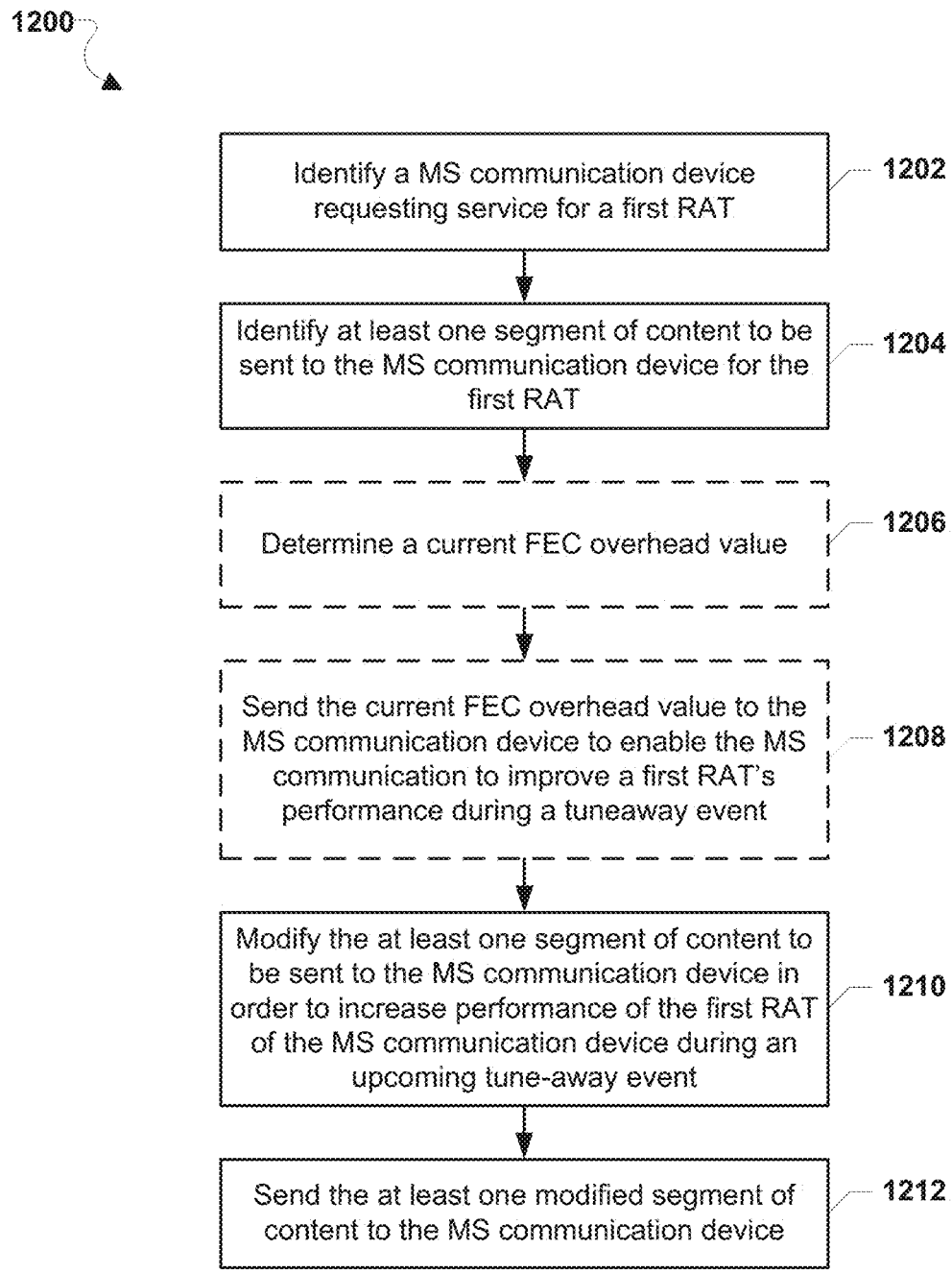
FIG. 12 is a process flow diagram illustrating a method for modifying content sent to a multi-standby communication device in order to increase the performance of an active RAT operating on the multi-standby communication device during a tune-away event according to various embodiments.

FIG. 12 illustrates a method 1200 for modifying data segments of content sent to a multi-standby communication device for a first RAT in order to increase the first RAT's reception performance during a tune-away event according to some embodiments. The method 1200 may be implemented with a server processor of a server (e.g., the server 1112 of FIG. 11). With reference to FIGS. 1-12, the server processor may begin performing the operations of the method 1200 in block 1202 by identifying a multi-standby communication device (e.g., a SRLTE+G, DSDS communication device) that is requesting service for a first RAT, such as via eMBMS.

In block 1204, the server processor may identify at least one segment of content to be sent to the multi-standby communication device for the first RAT. For example, the server processor may determine what segments of content are next scheduled for transmission or broadcast to the multi-standby communication device.

In optional block 1206, the server processor may optionally determine a current redundancy information overhead value (e.g., a current FEC overhead value). In some embodiments, the FEC overhead value may be an indication of the amount of redundancy information the server device will transmit to the multi-standby communication device along with the at least one segment of content.

In optional block 1208, the server processor may send the current FEC overhead value to the multi-standby communication device to enable the multi-standby communication device to improve the first RAT's reception performance during a tune away. In some embodiments, the device processor on the multi-standby communication device may utilize the current FEC overhead value when performing one or more of the methods 400 and 408*a*-408*f* (see, e.g., FIGS. 4-10). For example, the device processor may determine whether to skip a second RAT's tune-away operations during a tune-away event in response to determining that the current FEC overhead value is low, meaning that the device processor may be unable to recover as much lost or partially received data than if the current FEC overhead value were higher.

In block 1210, the server processor may modify the at least one segment of content to be sent to the multi-standby communication device in order to increase performance of the first RAT of the multi-standby communication device during an upcoming tune-away event. In some embodiments of the operations in block 1210, the server processor may perform operations in one or more of methods 1210*a*, 1210*b* (see FIGS. 13-14). By modifying the at least one segment of content being sent in order to increase performance of the first RAT, the server processor may enable the multi-standby communication device to improve the first RAT's reception performance during tune-away events, thereby enabling the server processor to ultimately reduce the amount of redundancy information that must be sent to the multi-standby communication device for the first RAT.

In some embodiments of the operations in block 1210, the server processor may interleave a plurality of segments of content to enable the multi-standby communication device to effectively recover lost or partially received data, for example, by utilizing interpolation and/or partial segment display. Because the loss of an entire segment (e.g., one second of content) may be difficult or impossible for an application layer on the multi-standby communication device to conceal, interleaved segments may reduce the risk that a tune-away event on the multi-standby communication device may disproportionally affect data associated with a particular segment. For example, rather than a tune-away event preventing the multi-standby communication device from receiving a majority of the data associated with a single segment (e.g., when the tune-away event overlaps almost entirely with the reception window for the segment), the tune-away event may only partially overlap with the reception window of two or more interleaved segments, resulting in considerably less segment data lost for any one segment and enabling less redundancy information for each of the segments to be required to recover any segment data that is lost.

In block 1212, the server processor may send the at least one modified segment of content to the multi-standby communication device.

Figure 13:
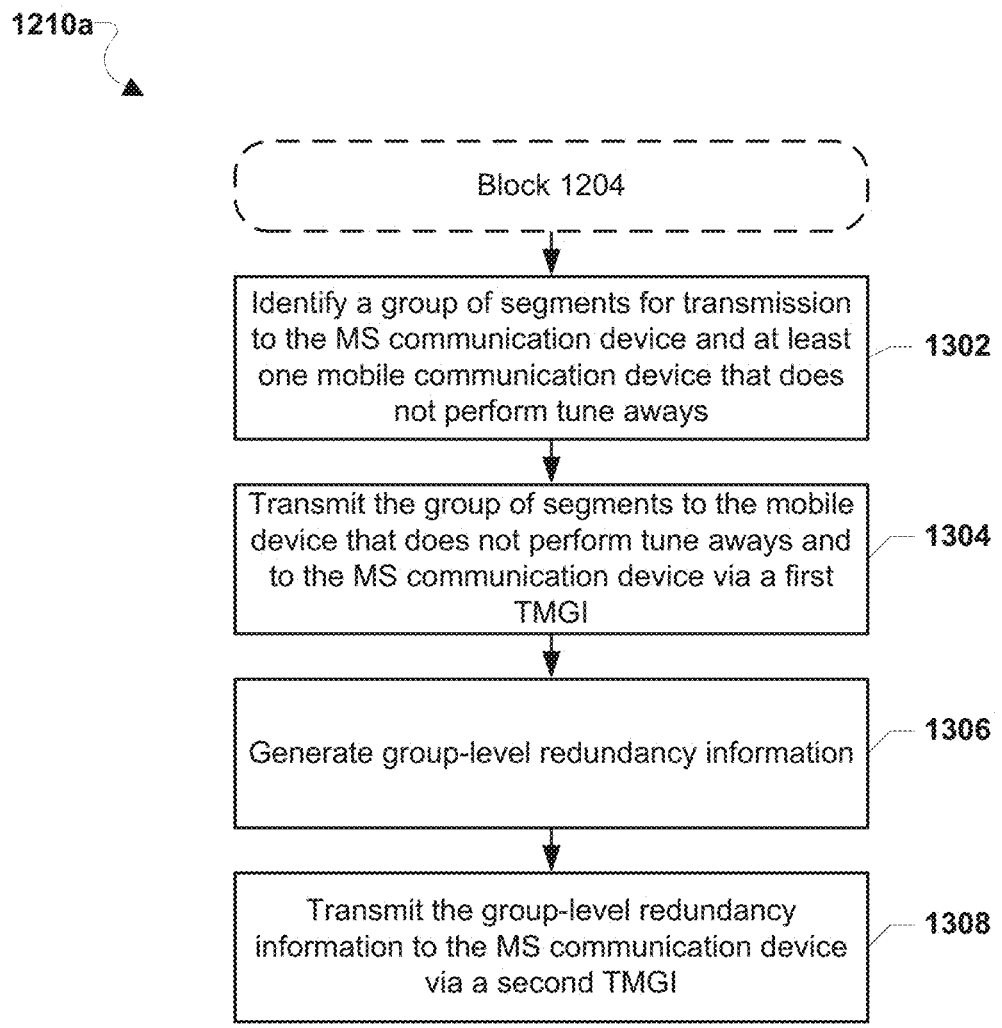
FIG. 13 is a process flow diagram illustrating a method for generating group-level redundancy information for a group of segments sent to a multi-standby communication device according to various embodiments.

FIG. 13 illustrates a method 1210*a* for modifying at least one segment of content to be sent to the multi-standby communication device. The method 1210*a* may be implemented with a processor of a server (e.g., the server 1112 of FIG. 11). With reference to FIGS. 1-13, the server processor may begin performing the operations of the method 1210*a* in block 1302.

In some optional embodiments, the operations of the method 1210*a* may implement embodiments of the operations of blocks 1210, 1212 of the method 1200 (e.g., as described with reference to FIG. 12). In such optional embodiments, the server processor may begin performing operations of the method 1210*a* in response to identifying at least one segment of content to be sent to the multi-standby communication device in block 1204.

In block 1302, the server processor may identify a group of segments for transmission to the multi-standby communication device and at least one mobile communication device that does not perform tune aways (e.g., a single-SIM, single-RAT communication device).

In block 1304, server processor may transmit the group segments to the mobile communication device that does not perform tune aways and to the multi-standby communication device via a first temporary mobile group identity (TMGI). In other words, the server processor may send segments of content using known and/or standard processes to such devices.

In block 1306, the server processor may generate group-level redundancy information. In some embodiments, group-level redundancy information may be redundancy information that applies to a group of segments (i.e., rather than an individual segment), such that when data from one segment is partially or completely lost, the group-level redundancy information included in any of the segments in the group may be used to recover that the lost data for that segment. For example, the group-level redundancy information may be a simple bitwise exclusive or ("XOR") of the group of segments.

In block 1308, the server processor may transmit the group-level redundancy information to the multi-standby communication device via a second TMGI. In other words, because including group-level redundancy data may increase network latency as more information must be sent, the server processor may only send group-level redundancy information to communication devices that may benefit from the ability to recover lost segment data using any segment in the group of segments. For example the multi-standby communication device may utilize the group-level redundancy information to recover segment data that may be lost as a result of performing a tune away, even when most or all of the segment data for that particular segment is lost, thereby improving the first RAT's overall reception performance.

Figure 14:
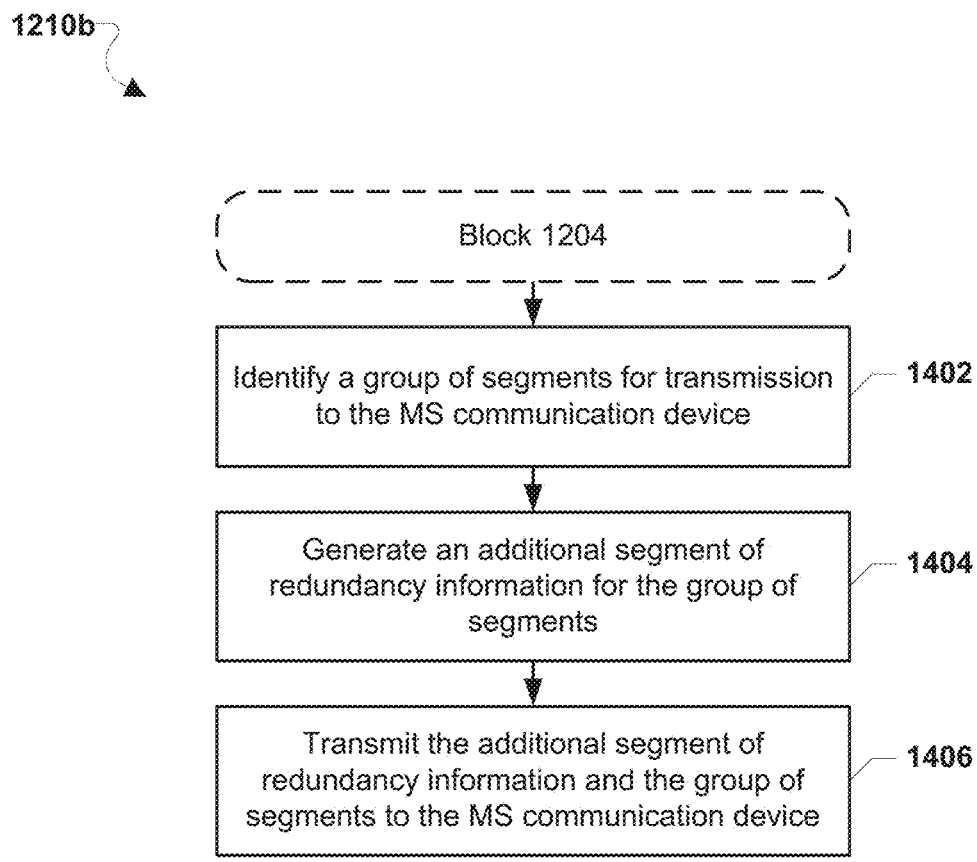
FIG. 14 is a process flow diagram illustrating a method for modifying a group of segments of content sent to a multi-standby communication device by sending an additional segment of redundancy information with the group of segments according to various embodiments.

FIG. 14 illustrates a method 1210*b* for modifying at least one segment of content to be sent to the multi-standby communication device by including in the at least one segment of content an additional segment that includes group-level redundancy information. The method 1210*b* may be implemented with a processor of a server (e.g., the server 1112 of FIG. 11). In some optional embodiments, the operations of the method 1210*b* may implement embodiments of the operations of blocks 1210, 1212 of the method 1200 as described with reference to FIG. 12. Thus, with reference to FIGS. 1-14, in such optional embodiments, the server processor may begin performing operations of the method 1210*b* in response to identifying at least one segment of content to be sent to the multi-standby communication device in block 1204.

In block 1402, the server processor may identify a group of segments for transmission to the multi-standby communication device, for example, as described in block 1302 of the method 1210*a*.

In block 1404, the server processor may generate an additional segment of redundancy information for the group of segments. In some embodiments, rather than including the group-level redundancy information in each of segments of the group, the server processor may create a standalone segment that may be used to recover lost or partially received segment data for any of the group of segments. Thus, because the redundancy information is not included in each segment but is instead included in a single separate segment, the total amount of group-level redundancy information that must be sent to the multi-standby communication device to enable the multi-standby communication device to recover lost segment data may be lower than including the group-level redundancy information with each segment of the group.

In block 1406, server processor may transmit the additional segment of redundancy information, in addition to the identified group of segments, to the multi-standby communication device.

In some embodiments (not shown), the server processor may send the group of segments to the multi-standby communication device via a first TMGI (e.g., as described with reference to FIG. 13) and may send the separate segment including the group-level redundancy information to the multi-standby communication device via a second TMGI.

Figure 15:
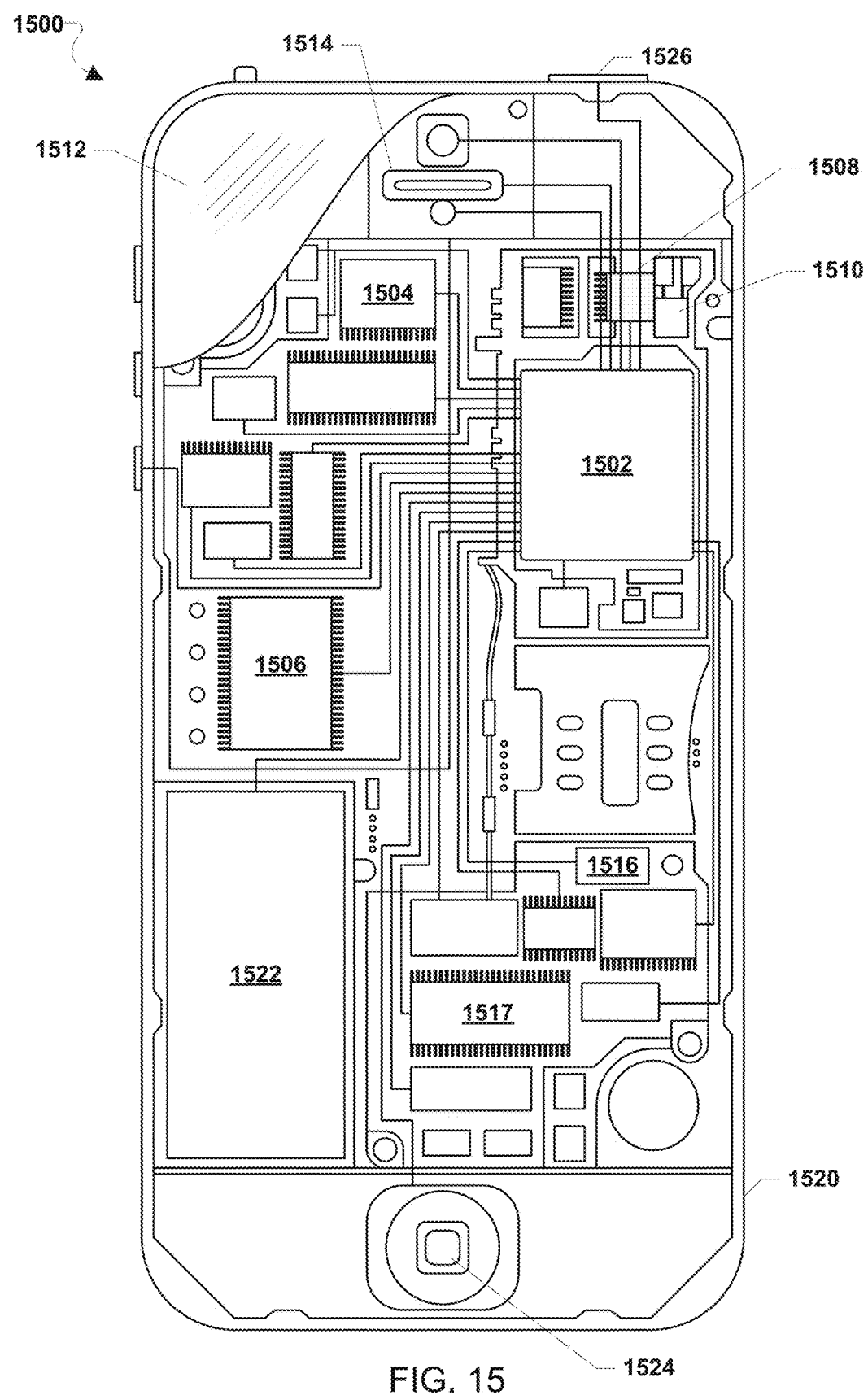
FIG. 15 is a component block diagram of a multi-standby communication device suitable for implementing some embodiment methods.

Various embodiments may be implemented in any of a variety of multi-standby communication devices, an example of which (e.g., multi-standby communication device 1500) is illustrated in FIG. 15. According to various embodiments, the multi-standby communication device 1500 may be similar to the multi-standby communication devices 110, 120, 200 as described above with reference to FIGS. 1-2 and 11. As such, the multi-standby communication device 1500 may implement the methods 400 and 408a-408f in FIGS. 4-10.

Thus, with reference to FIGS. 1-15, the multi-standby communication device 1500 may include a processor 1502 coupled to a touchscreen controller 1504 and an internal memory 1506. The processor 1502 may be one or more multi-core integrated circuits designated for general or specific processing tasks. The internal memory 1506 may be volatile or non-volatile memory, and may also be secure and/or encrypted memory, or unsecure and/or unencrypted memory, or any combination thereof. The touchscreen controller 1504 and the processor 1502 may also be coupled to a touchscreen panel 1512, such as a resistive-sensing touchscreen, capacitive-sensing touchscreen, infrared sensing touchscreen, etc. Additionally, the display of the multi-standby communication device 1500 need not have touch screen capability.

The multi-standby communication device 1500 may have a cellular network transceiver 1508 coupled to the processor 1502 and to an antenna 1510 and configured for sending and receiving cellular communications. The transceiver 1508 and the antenna 1510 may be used with the above-mentioned circuitry to implement various embodiment methods. The multi-standby communication device 1500 may include one or more SIM cards 1516 coupled to the transceiver 1508 and/or the processor 1502 and may be configured as described above. The multi-standby communication device 1500 may include a cellular network wireless modem chip 1517 that enables communication via a cellular network and is coupled to the processor.

The multi-standby communication device 1500 may also include speakers 1514 for providing audio outputs. The multi-standby communication device 1500 may also include a housing 1520, constructed of a plastic, metal, or a combination of materials, for containing all or some of the components discussed herein. The multi-standby communication device 1500 may include a power source 1522 coupled to the processor 1502, such as a disposable or rechargeable battery. The rechargeable battery may also be coupled to the peripheral device connection port to receive a charging current from a source external to the multi-standby communication device 1500. The multi-standby communication device 1500 may also include a physical button 1524 for receiving user inputs. The multi-standby communication device 1500 may also include a power button 1526 for turning the multi-standby communication device 1500 on and off.

Figure 16:
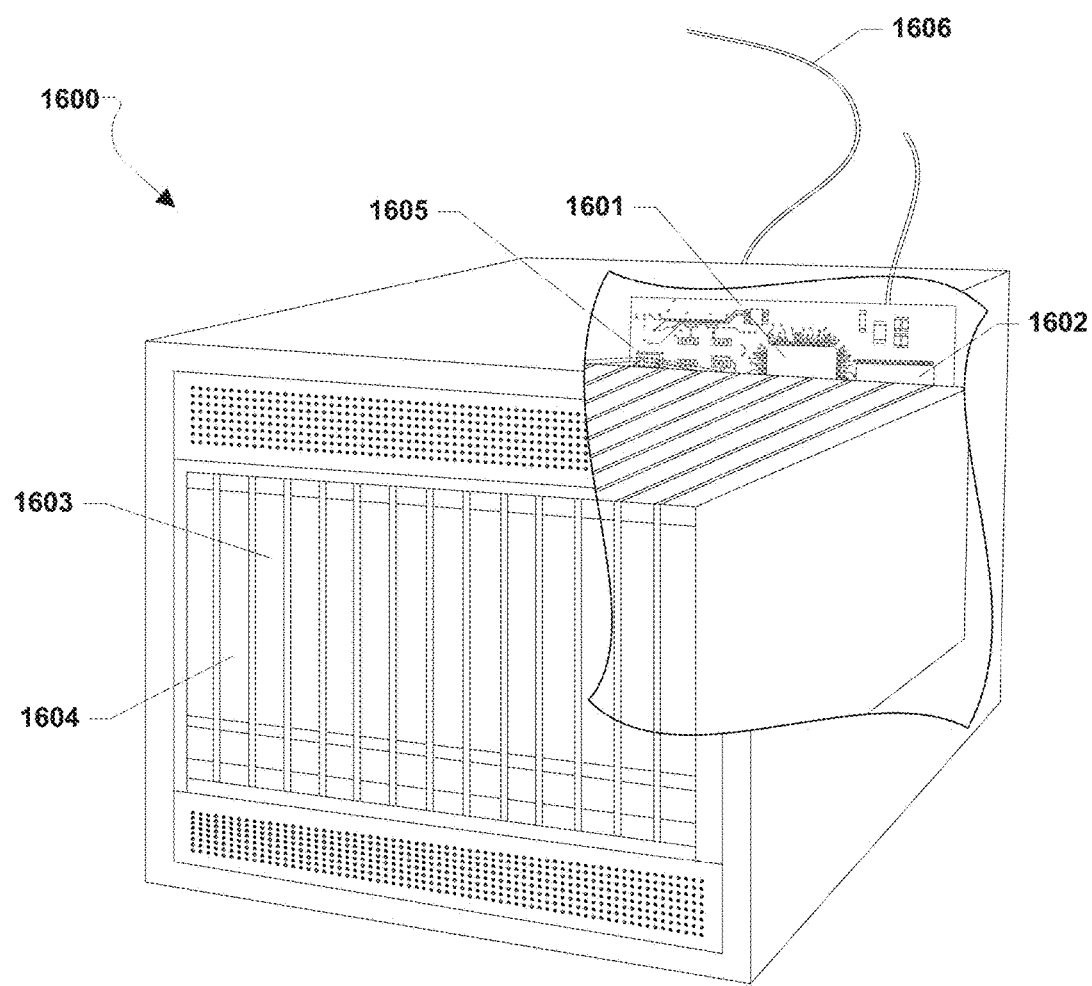
FIG. 16 is a component block diagram of a server device suitable for implementing some embodiment methods.

Portions of some embodiment methods may be accomplished in a client-server architecture with some of the processing occurring in a server (e.g., the server 1112 described with reference to FIG. 11). Such embodiments may be implemented on any of a variety of commercially available server devices, such as server device 1600 illustrated in FIG. 16. As such, the server device 1600 may implement the methods 1200, 1210a, 1210b of FIGS. 12-14.

Thus, with reference to FIGS. 1-16, the server device 1600 may include a processor 1601 coupled to volatile memory 1602 and a large capacity nonvolatile memory, such as a disk drive 1603. The server device 1600 may also include a floppy disc drive, compact disc (CD) or DVD disc drive 1604 coupled to the processor 1601. The server device 1600 may also include network access ports 1605 coupled to the processor 1601 for establishing data connections with a network 1606, such as a local area network coupled to other broadcast system computers and servers. The processor 1601 may be any programmable microprocessor, microcomputer or multiple processor chip or chips that can be configured by software instructions (applications) to perform a variety of functions, including the functions of the various aspects described above. Typically, software applications may be stored in the internal memories 1602, 1603 before they are accessed and loaded into the processor 1601. The processor 1601 may include internal memory sufficient to store the application software instructions.

As noted above, references herein to first and second RATs are arbitrary and for ease of description and reference purposes only. While the embodiment descriptions generally address tune-away events during which a second RAT preempts a first RAT by receiving access to a shared RF resource from the first RAT, the embodiments apply equally well when the circumstances and roles of the RATs are reversed and/or when an RF resource is shared by a first RAT and a second RAT that are both associated with a single subscription (i.e., on a single-SIM, single-radio communication device, such as a SRLTE communication device).

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method implemented on a mobile communication device for managing tune-away events between a first radio access technology (RAT) and a second RAT, comprising:
    determining a start time of a tune-away event from the first RAT to the second RAT that is scheduled to occur next;
    implementing a tune-away management strategy during the tune-away event in response to determining that the tune-away event has started or is about to start, comprising:
        determining a number of symbols that have been received for a current segment being received for the first RAT;
        determining a number of symbols of the current segment remaining to be received;
        determining whether a threshold number of symbols exceeds a sum of the number of received symbols and the number of symbols of the current segment remaining to be received;
        initiating a tune away from the first RAT to the second RAT in response to determining that the threshold number of symbols exceeds the sum of the number of received symbols and the number of symbols of the current segment remaining to be received; and
    resuming normal operations with the first RAT in response to determining that the tune-away event has ended.

2. The method of claim 1, wherein implementing a tune-away management strategy during the tune-away event further comprises:
    determining whether tune-away operations of the second RAT have ended before an expected end of the tune-away event; and
    initiating a tune back to the first RAT from the second RAT in response to determining that the tune-away operations of the second RAT have ended before the expected end of the tune-away event.

3. The method of claim 1, wherein implementing a tune-away management strategy during the tune-away event further comprises:
    determining whether the first RAT needs to receive critical data during the tune-away event;
    initiating a tune back to the first RAT from the second RAT to enable the first RAT to receive the critical data; and
    initiating another tune away from the first RAT to the second RAT.

4. The method of claim 1, further comprising:
    estimating a number of symbols of the current segment that would be lost during the tune-away event in response to determining that the threshold number of symbols does not exceed the sum of the number of received symbols and the number of symbols of the current segment remaining to be received;
    determining whether a difference between the sum and the estimated number of symbols that would be lost during the tune-away event is less than the threshold number of symbols;
    initiating a tune away from the first RAT to the second RAT in response to determining that the difference is not less than the threshold number of symbols; and
    preventing a tune away from the first RAT to the second RAT for an entire duration of the tune-away event in response to determining that the difference is less than the threshold number of symbols.

5. The method of claim 1, wherein implementing a tune-away management strategy during the tune-away event further comprises configuring the second RAT to receive with one of a plurality of diversity receivers and the first RAT to receive with a remainder of the plurality of diversity receivers during the tune-away event.

6. The method of claim 5, wherein configuring the second RAT to receive with one of a plurality of diversity receivers and the first RAT to receive with a remainder of the plurality of diversity receivers during the tune-away event comprises:
    determining whether configuring the first RAT to receive with fewer than all of the plurality of diversity receivers during the tune-away event would cause the first RAT to experience unacceptable performance;
    preventing a tune away from the first RAT to the second RAT during the tune-away event in response to determining that configuring the first RAT to receive with fewer than all of the plurality of diversity receivers during the tune-away event would result in unacceptable performance; and configuring the second RAT to receive with one of the plurality of diversity receivers and the first RAT to receive with the remainder of the plurality of diversity receivers during the tune-away event in response to determining that configuring the first RAT to receive with fewer than all of the plurality of diversity receivers during the tune-away event would not result in unacceptable performance.

7. A method implemented on a server for reducing redundancy information overhead needed by a multi-standby communication device performing tune aways between a first radio access technology (RAT) and a second RAT, comprising:

identifying at least one segment of content data to be sent to the multi-standby communication device;

modifying the at least one segment of content data in order to produce a modified segment of content data that enables the first RAT of the multi-standby communication device to increase performance of the first RAT during a tune-away event;

determining a current redundancy information overhead value; and sending the at least one modified segment of content data and the current redundancy information overhead value to the multi-standby communication device to enable the multi-standby communication device.

8. The method of claim 7, wherein modifying the at least one segment of content data in order to produce a modified segment of content data that enables the first RAT of the multi-standby communication device to increase performance of the first RAT during a tune-away event comprises:

identifying a group of segments of content data for transmission to the multi-standby communication device and at least one mobile communication device that does not perform tune aways;

transmitting the group of segments of content data to the at least one mobile communication device that does not perform tune aways and the multi-standby communication device via a first temporary mobile group identity (TMGI);

generating group-level redundancy information for the group of segments of content data; and transmitting the group-level redundancy information to the multi-standby communication device via a second TMGI.

9. The method of claim 7, wherein modifying the at least one segment of content data in order to produce a modified segment of content data that enables the first RAT of the multi-standby communication device to comprises:

identifying a group of segments of content data for transmission to the multi-standby communication device;

generating an additional segment of redundancy information for the group of segments of content data; and transmitting the additional segment of redundancy information and the group of segments of content data to the multi-standby communication device.

10. The method of claim 7, wherein modifying the at least one segment of content data in order to produce a modified segment of content data that enables the first RAT of the multi-standby communication device to comprises:

interleaving a plurality of segments of content data.

11. A multi-standby communication device, comprising:
a radio-frequency resource; and
a processor configured to be coupled to a Subscriber Identity Module and the radio-frequency resource, wherein the processor is configured to:
determine a start time of a tune-away event from a first radio access technology (RAT) to a second RAT that is scheduled to occur next;
implement a tune-away management strategy during the tune-away event in response to determining that the tune-away event has started or is about to start, by;
determining a number of symbols that have been received for a current segment being received for the first RAT;
determining a number of symbols of the current segment remaining to be received;
determining whether a threshold number of symbols exceeds a sum of the number of received symbols and the number of symbols of the current segment remaining to be received;
initiating a tune away from the first RAT to the second RAT in response to determining that the threshold number of symbols exceeds the sum of the number of received symbols and the number of symbols of the current segment remaining to be received; and
resume normal operations with the first RAT in response to determining that the tune-away event has ended.

12. The multi-standby communication device of claim 11, wherein the processor is further configured to:
determine whether tune-away operations of the second RAT have ended before an expected end of the tune-away event; and
initiate a tune back to the first RAT from the second RAT in response to determining that the tune-away operations of the second RAT have ended before the expected end of the tune-away event.

13. The multi-standby communication device of claim 11, wherein the processor is further configured to:
determine whether the first RAT needs to receive critical data during the tune-away event;
initiate a tune back to the first RAT from the second RAT to enable the first RAT to receive the critical data; and
initiate another tune away from the first RAT to the second RAT.

14. The multi-standby communication device of claim 11, wherein the processor is further configured to:
estimate a number of symbols of the current segment that would be lost during the tune-away event in response to determining that the threshold number of symbols does not exceed the sum of the number of received symbols and the number of symbols of the current segment remaining to be received;
determine whether a difference between the sum and the estimated number of symbols that would be lost during the tune-away event is less than the threshold number of symbols;
initiate a tune away from the first RAT to the second RAT in response to determining that the difference is not less than the threshold number of symbols; and
prevent a tune away from the first RAT to the second RAT for an entire duration of the tune-away event in response to determining that the difference is less than the threshold number of symbols.

15. The multi-standby communication device of claim 11, wherein the processor is further configured to configure the second RAT to receive with one of a plurality of diversity receivers and the first RAT to receive with a remainder of the plurality of diversity receivers during the tune-away event.

16. The multi-standby communication device of claim 15, wherein the processor is further configured to:
   determine whether configuring the first RAT to receive with fewer than all of the plurality of diversity receivers during the tune-away event would cause the first RAT to experience unacceptable performance;
   prevent a tune away from the first RAT to the second RAT during the tune-away event in response to determining that configuring the first RAT to receive with fewer than all of the plurality of diversity receivers during the tune-away event would result in unacceptable performance; and
   configure the second RAT to receive with one of the plurality of diversity receivers and the first RAT to receive with the remainder of the plurality of diversity receivers during the tune-away event in response to determining that configuring the first RAT to receive with fewer than all of the plurality of diversity receivers during the tune-away event would not result in unacceptable performance.

17. The multi-standby communication device of claim 11, wherein the processor is further configured to:
   initiate a tune away from the first RAT to the second RAT;
   determine whether the first RAT needs to receive critical data during the tune-away event;
   initiate a tune back to the first RAT from the second RAT to enable the first RAT to receive the critical data; and
   initiate another tune away from the first RAT to the second RAT.

18. A server, comprising:
   a server processor configured to:
      identify at least one segment of content data to be sent to a multi-standby communication device that performs tune aways from a first radio access technology (RAT) to a second RAT;
      modify the at least one segment of content data in order to produce a modified segment of content data that enables the first RAT of the multi-standby communication device to increase performance of the first RAT during a tune-away event;
      determine a current redundancy information overhead value; and
      send the at least one modified segment of content data and the current redundancy information overhead value to the multi-standby communication device to enable the multi-standby communication device.

19. The server of claim 18, wherein the server processor is configured to:
   identify a group of segments of content data for transmission to the multi-standby communication device and at least one mobile communication device that does not perform tune aways;
   transmit the group of segments of content data to the at least one mobile communication device that does not perform tune aways and the multi-standby communication device via a first temporary mobile group identity (TMGI);
   generate group-level redundancy information for the group of segments of content data; and
   transmit the group-level redundancy information to the multi-standby communication device via a second TMGI.

20. The server of claim 18, wherein the server processor is configured to:
   identify a group of segments of content data for transmission to the multi-standby communication device;
   generate an additional segment of redundancy information for the group of segments of content data; and
   transmit the additional segment of redundancy information and the group of segments of content data to the multi-standby communication device.

21. The server of claim 18, wherein
   the server processor is configured to modify the at least one segment of content data in order to produce a modified segment of content data that enables the first RAT of the multi-standby communication device to increase performance of the first RAT during a tune-away event comprises:
      interleaving a plurality of segments of content data.

22. A method implemented on a mobile communication device for managing tune-away events between a first radio access technology (RAT) and a second RAT, comprising:
   determining a start time of a tune-away event from the first RAT to the second RAT that is scheduled to occur next;
   implementing a tune-away management strategy during the tune-away event in response to determining that the tune-away event has started or is about to start by:
      determining whether configuring the first RAT to receive with fewer than all of a plurality of diversity receivers during the tune-away event would cause the first RAT to experience unacceptable performance;
      preventing a tune away from the first RAT to the second RAT during the tune-away event in response to determining that configuring the first RAT to receive with fewer than all of the plurality of diversity receivers during the tune-away event would result in unacceptable performance; and
      configuring the second RAT to receive with one of the plurality of diversity receivers and the first RAT to receive with the remainder of the plurality of diversity receivers during the tune-away event in response to determining that configuring the first RAT to receive with fewer than all of the plurality of diversity receivers during the tune-away event would not result in unacceptable performance; and
   resuming normal operations with the first RAT in response to determining that the tune-away event has ended.

23. The method of claim 22, wherein implementing a tune-away management strategy during the tune-away event further comprises:
   initiating a tune away from the first RAT to the second RAT;
   determining whether tune-away operations of the second RAT have ended before an expected end of the tune-away event; and
   initiating a tune back to the first RAT from the second RAT in response to determining that the tune-away operations of the second RAT have ended before the expected end of the tune-away event.

24. The method of claim 22, wherein implementing a tune-away management strategy during the tune-away event further comprises:
   initiating a tune away from the first RAT to the second RAT;
   determining whether the first RAT needs to receive critical data during the tune-away event;

initiating a tune back to the first RAT from the second RAT to enable the first RAT to receive the critical data; and initiating another tune away from the first RAT to the second RAT.

25. A multi-standby communication device, comprising:
a radio-frequency resource; and
a processor configured to be coupled to a Subscriber Identity Module and the radio-frequency resource, wherein the processor is configured to:
  determine a start time of a tune-away event from a first radio access technology (RAT) to a second RAT that is scheduled to occur next;
  implement a tune-away management strategy during the tune-away event in response to determining that the tune-away event has started or is about to start, by;
    determining whether configuring the first RAT to receive with fewer than all of a plurality of diversity receivers during the tune-away event would cause the first RAT to experience unacceptable performance;
    preventing a tune away from the first RAT to the second RAT during the tune-away event in response to determining that configuring the first RAT to receive with fewer than all of the plurality of diversity receivers during the tune-away event would result in unacceptable performance; and
    configuring the second RAT to receive with one of the plurality of diversity receivers and the first RAT to receive with the remainder of the plurality of diversity receivers during the tune-away event in response to determining that configuring the first RAT to receive with fewer than all of the plurality of diversity receivers during the tune-away event would not result in unacceptable performance; and
  resume normal operations with the first RAT in response to determining that the tune-away event has ended.

26. The multi-standby communication device of claim 25, wherein the processor is further configured to:
  initiate a tune away from the first RAT to the second RAT;
  determine whether tune-away operations of the second RAT have ended before an expected end of the tune-away event; and
  initiate a tune back to the first RAT from the second RAT in response to determining that the tune-away operations of the second RAT have ended before the expected end of the tune-away event.

* * * * *